(12) United States Patent
Samid

(10) Patent No.: US 11,159,317 B2
(45) Date of Patent: Oct. 26, 2021

(54) SPACEFLIP PLUS: ORDINAL CRYPTOGRAPHY

(71) Applicant: Gideon Samid, Rockville, MD (US)

(72) Inventor: Gideon Samid, Rockville, MD (US)

(*) Notice: Subject to any disclaimer, the term of this patent is extended or adjusted under 35 U.S.C. 154(b) by 0 days.

(21) Appl. No.: 17/216,274

(22) Filed: Mar. 29, 2021

(65) Prior Publication Data

US 2021/0226923 A1 Jul. 22, 2021

Related U.S. Application Data

(63) Continuation-in-part of application No. 17/001,163, filed on Aug. 24, 2020, now Pat. No. 10,965,460, which is a continuation of application No. 16/855,517, filed on Apr. 22, 2020, now Pat. No. 10,790,977, and a continuation of application No. 16/687,690, filed on Nov. 19, 2019, now Pat. No. 10,673,822, which is a continuation of application No. 16/444,892, filed on Jun. 18, 2019, now Pat. No. 10,523,642.

(60) Provisional application No. 63/005,062, filed on Apr. 3, 2020, provisional application No. 63/034,401, filed on Jun. 4, 2020, provisional application No. 63/051,652, filed on Jul. 14, 2020, provisional application No. 63/140,006, filed on Jan. 21, 2021.

(51) Int. Cl.
*H04L 9/12* (2006.01)
*H04L 9/08* (2006.01)
*H04L 29/06* (2006.01)

(52) U.S. Cl.
CPC .............. *H04L 9/12* (2013.01); *H04L 9/0891* (2013.01); *H04L 63/0407* (2013.01); *H04L 63/0471* (2013.01)

(58) Field of Classification Search
CPC ....................................... H04L 9/12
See application file for complete search history.

(56) References Cited

U.S. PATENT DOCUMENTS

| 6,823,068 B1* | 11/2004 | Samid | H04L 9/0838 380/277 |
| 2008/0279367 A1* | 11/2008 | Thaker | G09C 1/00 380/28 |
| 2012/0331283 A1* | 12/2012 | Chandran | H04L 9/088 713/150 |
| 2017/0250796 A1* | 8/2017 | Samid | H04L 9/0838 |

\* cited by examiner

*Primary Examiner* — Bradley W Holder

(57) ABSTRACT

Extending the "SpaceFlip" cipher defined in the continued application (Ser. No. 16/855,517) to increase the lifespan of the shared secret key, and avoid the need for key replacement; applicable to Internet of Things devices where re-access is prohibitive, adding convenience to normal secure communication; extending the use of the SpaceFlip quantum safe cryptography. Applying key equivocation cryptography where several keys are interchangeable.

11 Claims, 3 Drawing Sheets

Ordinal Cryptography Protocol

Ordinal Cryptography Protocol

Mediated 'FKC Communication

SpaceFlip+ within Forever key Cryptography

NEXT Equivocation Resolution

SPACEFLIP PLUS: ORDINAL CRYPTOGRAPHY

The cryptographic operations described in the continued U.S. patent application Ser. No. 16/855,517, entitled: SpaceFlip, are herewith enhanced to extend the life of the shared key, $K_0$.

SUMMARY

A key derivation algorithm $D_1$ operates on $K_0$ to extract a working key, $K_1$, which is used in the SpaceFlip procedure to generate a cryptographic output, O, from a cryptographic input I: $O=f(I,K_1)$; the nature of the SpaceFlip function f is such that there are infinite number of keys $K'_1, K''_1, \ldots$ that would generate the same output, O, from the same input, I, and hence any cryptanalytic gains made through the use of $K_1$ will be lost when the users will apply a second derivation algorithm $D_2$ to extract a second SpaceFlip key, $K_2$, from $K_0$, and similarly when derivation algorithm $D_3$ is applied to derive $K_3$ from $K_0$, continuing indefinitely; the shared key $K_0$ remains shielded from previous cryptanalytic gains, and provides security indefinitely. This novel feature of key equivocation is due to the fact that SpaceFlip is using its cryptographic keys solely on the basis of their ordinal properties, namely properties related to the bilateral value relationships among the elements of the key. Applicable to authentication procedures, as well as to encryption procedures. Increasing the lifespan of a shared key offers a great practical cyber advantage especially when it is hard to replace an installed key. Applied to network communication Ordinal Cryptography offers secure communication between strangers.

This figure shows the shared secret key, $K_0$ feeding into a derivation algorithm, $D_1$, yielding the first use key $K_1$. It shows in the horizontal line USE-1 that this key, $K_1$ is used for a certain measure of cryptographic production. Beneath this depiction the figure shows a graphic indicating how as $K_1$ is being used (and the cryptographic output is exposed to attackers) these attackers gain a certain cryptographic insight into $K_1$, which increases with use. However, before such gain becomes damaging to the users, the protocol calls for deriving the next key $K_2$ from the master key, $K_0$, using the $D_2$ derivation algorithm. Once derived the $K_2$ key is put to use. The advantage of the ordinal protocol is that the cryptanalytic advantage gained from use of $K_1$, is not useful for cracking the new key, $K_2$. That is because $K_1$ was used per its ordinal properties only, which means that each of the infinite number of ordinally equal keys could have been the one used instead of $K_1$. This equivocation then projects on $K_0$, even if the particulars of the derivation algorithm $D_1$ are known. And if $K_0$ is equivocated then the same can be said about $K_2$. This in turn means that all the cryptographic insight gained via the use of $K_1$ is useless towards cracking $K_2$. The attacker will gain insight into $K_2$ through the use of $K_2$, as depicted in Use-2 stretch. This insight will be gained as if $K_2$ is the first key derived from $K_0$. $K_2$ will be replaced after some usage by key $K_3$, and so on indefinitely. In summary, the shared finite key, $K_0$, will serve the users indefinitely. The users will have to mind the extent of use of each key. If overused then it may be cracked via brute force before it is being switched to the next key and thereby security is breached.

Figure 2:
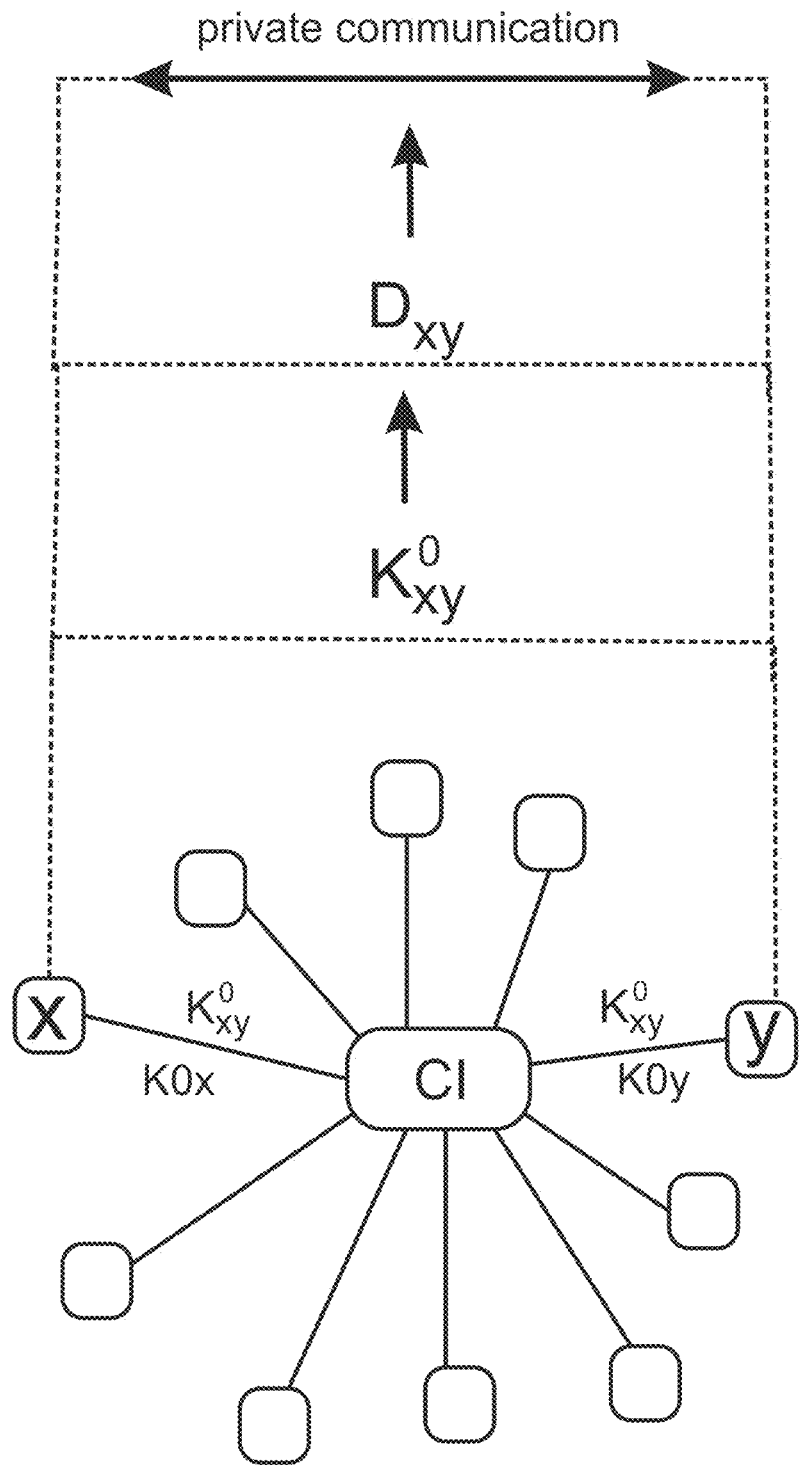

FIG. 2 Mediated FKC Communication

The figure shows a group of communication elements, which are strangers to each other. The members of the groups all make connection to a 'central identifier', CI, depicted in the center. The CI verifies the identities of the connecting entity according to some prevailing verification standard. Once identity is verified the CI exchanges a master key with each member of the group. This master key is used by a 'forever key cryptography' FKC protocol. The figure further shows two members of the group, elements x and y, who wish to communicate privately with each other. They both express this will to the CI. Using $K^0_x$ the CI delivers to element x an ad-hoc randomized key $K^0_{xy}$ to be shared with element y. The CI similarly, using $K^0_y$ communicates to element y the same key $K^0_{xy}$. As shown on the dotted line once x and y share $K^0_{xy}$ they use it as a master key for FKC communication protocol. To so practice they decide on a derivation algorithm $D_{xy}$ and with it generate a use key, $K^1_{xy}$, and establish private communication. The users will use $K^1_{xy}$ to a certain extent then use the master key, $K^0_{xy}$, and another derivation algorithm $D'_{xy}$ to generate another use key, $K^2_{xy}$. And so on.

Figure 3:
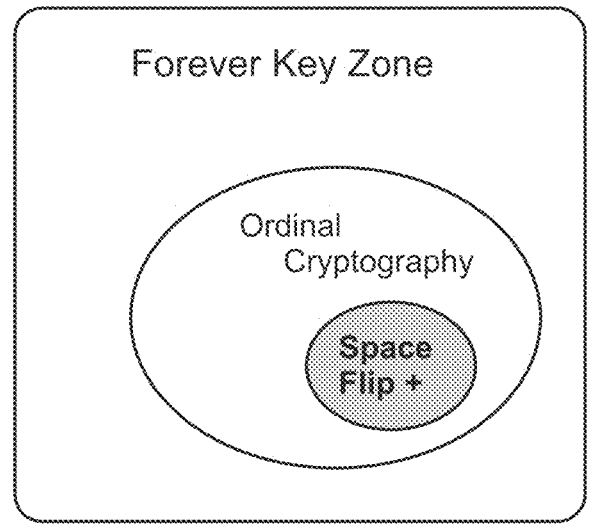

FIG. 3 SpaceFlip+ within Forever Key Cryptography

This figure shows the larger area representing the "Forever Key" zone—all the cryptographic procedures in which the same relationship between cryptographic input and cryptographic output can be effected through infinitely many different keys. This fact allows for a master key to be a source of a succession of use keys, which themselves may be cryptanalyzed while protecting the integrity of the master key. In this broad zone, the figure depicts "Ordinal Cryptography"—a sub-zone: procedures which achieve the 'forever requirement' by relying only on ordinal properties of keys. Based on the fact that there are infinite keys sharing the same ordinal image, and hence projecting the same impact despite being numerically different. Within the Ordinal Cryptography zone, the figure shows the SpaceFlipPlus procedures, which are a particular way in which ordinal properties are used to effect cryptographic tasks.

Figure 4:
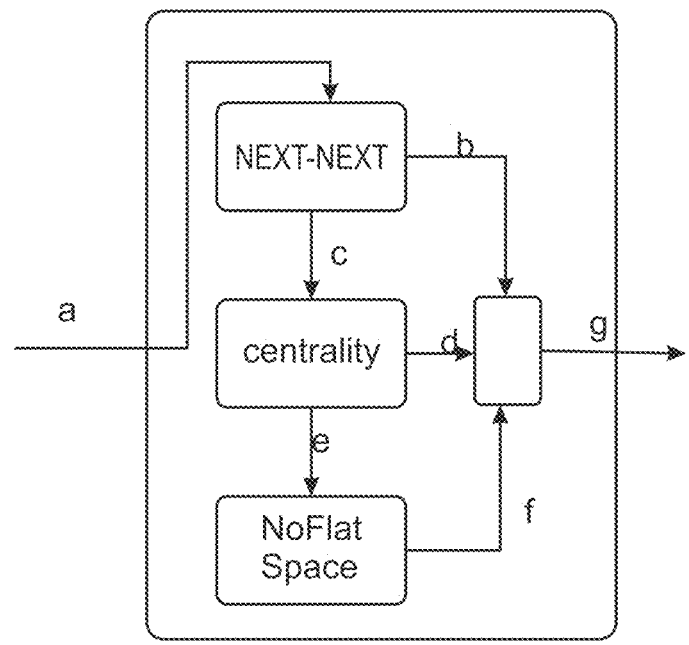

FIG. 4 NEXT Equivocation Resolution

This figure depicts an optional strategy to resolve NEXT function equivocation. Line a represents the entry of the candidate letters for a NEXT status over a reference letter, X. The candidates are first processed via the NEXT-NEXT procedure. This procedure is recursive, it may re-invoke itself several times, perhaps indefinitely. So its use must be limited by some number of invocations. The result of this procedure may be a resolution—identifying which candidate is the NEXT(X) letter. This result is communicated through line b a switch box from where line g sends out the resolution. If NEXT-NEXT is not successful, the figure shows line c leading to the centrality test. The NEXT-NEXT procedure could have reduced the equivocation, namely reduced the list of candidates for the centrality procedure to sort through. The centrality procedure may resolve the equivocation and notify the switch box through communication pathway d, which is then coming out as channel g. Or, if there is no full resolution, the remaining candidates are communicated to the procedure that builds the associate zero-flatness space where the candidates are fully sorted and a NEXT(X) is identified through line f, and output through line In some applications the N-Flatness space procedure may be skipped and the g answer may be 'unresolved'. Then the procedure may call for the NEXT to be identified among the remaining letters in the alphabet, or a new NEXT is used over a different letter.

Environment: This invention regards data operations involving a language A comprised of n letters L1, L2, ... Ln. The letters are situated in a 'space' which is defined as a set of q=0.5n(n−1) distances between every pair of letters; the measure of such distances is written as [Li,Lj]=[i,j]. These q values are considered secret and known only to two (or more) communicating partners who use this shared secret to carry out cryptographic protocols. The essence of this invention is a mechanism that increases the longevity of the finite shared secret, enabling it to serve the communicating partners indefinitely.

INTRODUCTION

This invention is based on particular mathematics related to ordinal properties of sets. It would be described ahead. Then we would present the use of this mathematics for cryptographic purposes, and subsequently we will describe design options for SpaceFlipPlus.

Ordinal Properties of Sets

We define a numeric set as a set of elements comprising identity and numeric value. The identity of each element is set unique (namely no other element in the set bears the same identity mark), and the numbers are limited to real numbers. The set {A, B, C} with the corresponding values −1, 34, π is a proper numeric set. The set {X, Y, Z} with the corresponding values 1, 2, 4+8i is not a proper numeric set.

Two numeric sets will be considered "numerically equivalent" (or say "numerically equal"), if the elements can be matched in a bijection mode such the numeric values of each pair of matching elements are the same. The sets {A, B} with numeric values {7,12} is numerically equivalent with set {X,Y} with numeric values {7, 12}.

We define now a mathematical construct regarded as "ordinal property". Two numeric sets will be considered "ordinally equal" (or "ordinally equivalent") if each pair of elements in one set may be matched with a corresponding pair of elements in the other set such that the pair-wise ordinal function of the respective values will be the same.

We define an ordinal function "o" over a pair of ordered real numbers a, and b: o(a,b) as follows:
If a<b then o(a,b)=−1
If a=b then o(a,b)=0
If a>b then o(a,b)=1

Let X and X' be two proper numeric sets comprised of n elements each. Every element x∈X is matched with an element x'∈X'. X and X' will be regarded as "ordinally equivalent" if, and only if:

$$o(x_i, x_j) = o(x'_i, x'_j) \ldots \text{for all } i,j=1, 2, \ldots n$$

where $x_i$ represents the numeric value of $x_i$; $x_j$ represents the numeric value of $x_j$; $x'_i$ represents the numeric value of $x'_i$; $x'_j$ represents the numeric value of $x'_j$.

Illustration: Let X={$x_1$, $x_2$, $x_3$, $x_4$} with corresponding values: −1 12 100 6; and let: X'={$x'_1$, $x'_2$, $x'_3$, $x'_4$} with corresponding values: 30 32 33 31;

In this case X and X' will be ordinally equal because the ordinal value of each pair is the same in both sets. For example $o(x_2, x_4)=1$, and $o(x'_2, x'_4)=1$.

We examine the following case: X={$x_1$, $x_2$, $x_3$, $x_4$} with corresponding values: 1, 2, 2 300; and also: X'={$x'_1$, $x'_2$, $x'_3$, $x'_4$} with corresponding values: 1, 2, 3, 4;

In this case X and X' will be ordinally non-equivalent because $o(x_2, x_3)=0$ while $o(x'_2, x'_3)=−1$ Lemma: every numerically equivalent pair of sets is also ordinally equal, but not every ordinally equal set is also numerically equivalent.

Proof: the first part is proven by asserting $x_i = x'_i$ for i=1, 2, ... n. The second part is proven by the example of the first illustration above.

The fundamental Lemma of Ordinal Properties: Every numeric set has an infinite number of ordinally equivalent sets.

Note: we may use the phrase "ordinally equal" and "ordinally equivalent" interchangeably.

Proof: Let $x'_i = x_i + \delta$, for i=1, 2, ... n where δ is any real number. Accordingly:

$$x'_i - x'_j = (x_i + \delta) - (x_j + \delta) = x_i - x_j,$$

and hence:

$$o(x_i, x_j) = o(x'_i, x'_j) \ldots \text{for } i,j=1,2, \ldots n.$$

And since: −∞<δ<∞, the lemma is proven.

More generally: Let the n items of a numeric set X be organized according to their numeric values: $x_1$, $x_2$, ... $x_n$ such that for any i<j $x_i \le x_j$ for i,j=1, 2, ... n. Let Y be a numeric set of n items. Let us match the n items in both sets and mark them such that $y_i$ is the match for $x_i$. We can then line up the n y items to match the order of the n x items. The numeric values will also be lined up: $y_1$, $y_2$, ... $y_n$.

In order for the sets X and Y to be ordinally equivalent we require:

$$y_i = (x_i + \rho_i(x_{i+1} - x_i))$$

for $0 < \rho_i < 1$ for all i=1, 2, ... n

Thereby given any set element $x_i$, the corresponding $y_{i-1}$, $y_{i-2}$ ... will be lower in value, and the corresponding $y_i$, $y_{i+1}$, $y_{i+2}$ ... will be higher in value, unless $x_i = x_{i+1}$, in which case $y_i = x_i$. And since $x_i$ by construction is larger than $x_i$, $x_{i-1}$, ... and smaller than $x_{i+1}$, $x_{i+2}$, ... we have ordinal equivalence between the two sets. This proof of ordinal equivalence allows for an infinite value variety of $\rho_1$, $\rho_2$, ... $\rho_i$, ..., which implies that there are infinite number of n y values that will be ordinally equivalent to the n x values.

We can also prove that for the case where $y_i = s * x_i$, where s is any positive real number. We can write:

$$y_j - y_i = s(x_j - x_i)$$

and hence: $o(y_j, y_i) = s \, o(x_j - x_i)$
and since s>0 we conclude that $o(y_j, y_i) = o(x_j, x_i)$ for all values of i,j=1, 2 ... n Conclusion: there is infinite number of choices for the values of s, and $\rho_1, \rho_2, \ldots \rho_n$, hence any ordinal set has infinite sets ordinally equal to it.

Matrix Elements as Numeric Sets

Given a square matrix n×n listing m elements [1], [2], ... [n] as columns and as rows with the $n^2$ cells of the matrix representing an assigned measure of distance between every one of the n elements to every other. The distance measure written as $d_{ij}$ is representing the distance between elements i and j. These $n^2$ matrix cells may be viewed as a numeric set. Each cell has a unique identity designated by the value of i and j, and a unique value—the positive distance between i and j.

Two such matrices $M_1$ and $M_2$ over a set of n elements [1], [2], ... [n] may be numerically different but ordinally equivalent.

Complete Ordinal Dis-Equality

Two numeric sets X, and X' with matching n elements will be regarded as completely dis-equal if and only if:

$$o(x_i, x_j) \neq o(x'_i, x'_j) \ldots \text{for every combination of } i,j=1, 2, \ldots n$$

Illustration: Let $X=\{x_1, x_2, x_3, x_4\}$ with corresponding values: 1, 2, 3, 4; and let: $X'=\{x'_1, x'_2, x'_3, x'_4\}$ with corresponding values: 4, 3, 2, 1

In this case X and X' will be ordinally completely dis-equivalent because the ordinal value of each pair is different in both sets.

Ordinal Similarity

Two numeric sets of matching n elements for which e pairs have the same ordinal value, and 0.5n(n−1)-e pairs have different ordinal values between the sets, will be regarded as having ordinal similarity σ defined as $$\sigma = e/0.5n(n-1)$$

Ordinal similarity may range from zero (state of complete dis-equality) to one (state of equality):

$$0 \leq \sigma \leq 1$$

Ordinal Properties of a Set

Any property of a set which is the same for all the sets ordinally equal to it, will be regarded as an ordinal property of the set.

The Ordinal Equivocation Premise

Let information quantity Z be generated by operating on a numeric set X such that Z is generated by an ordinal property of X. In that case no analysis of Z will be able to determine whether it was generated by X or by any of the infinite number of sets, which are ordinally equal to X. This is on account of the definition of an ordinal property of a set.

Ordinal Disruption Operation

Let $D_o$ be an operation applied on a numeric set X, with n elements, such that the result is another numeric set, X* with the same number of elements, but such that the ordinal similarity or say ordinal similarity index, σ, between X, and X* is zero or close "enough" to it:

$$\sigma(X, X^*) \to 0$$

Such an operation, $D_o$, will be regarded as ordinal-disruption operator on X.

The Ordinal Matrix Numeric Set

A numeric set X with n elements may be associated with an n×n matrix constructed with the n elements both columns and rows, and where $o_{ij}$ fitted for row i and column j, represents the ordinal value of elements $x_i$ and $x_j$ in the given order, $o_{ij}=o(x_i, x_j)$. This matrix will be regarded as the "Ordinal Image" of the numeric set.

Illustration. Let $X=\{x_1, x_2, x_3\}$ or respective values 3, 5, 5, The corresponding ordinal matrix will be:

|       | $x_1$ | $x_2$ | $x_3$ |
|-------|-------|-------|-------|
| $x_1$ | 0     | −1    | −1    |
| $x_2$ | 1     | 0     | 0     |
| $x_3$ | 1     | 0     | 0     |

Flatness of an Ordinal Matrix

Flatness is a measure of how many zeros there are in the ordinal matrix. Written in a matrix form, we formally account also for the main diagonal representing the 'fake' ordinal values of an element relative to itself, which is always zero. We therefore don't count these diagonal placed zeros. In the ordinal matrix representing a numeric set with n elements, there are z zeros, and the other 0.5n(n−1)-z matrix values are not zeros. If all the values of the ordinal matrix are zeros, then the represented set is regarded as 'completely flat set'. If there are no zeros (z=0), then the represented set is regarded a 'completely non-flat'. And for in between values of z, the represented set is regarded as partially flat. We compute:

$$\varphi = z/0.5n(n-1)$$

Ordinal Disruption Options

An efficient way to disrupt ordinal status of a numeric state is to apply some procedure involving modular arithmetic. Modular arithmetic will switch large values to small values. Combined with an enlargement option like squaring or raising to some power, p, a numeric set X may be turned to a numeric set X* where the similarity index between them σ(X, X*) is very low.

For example a set X with elements $x_1, x_2, \ldots x_n$ will be operated on, element by element as:

$$x^*_i = x_i^2 \text{ MOD } R$$

Where one may choose R to at least 2 or 3 times n,

Illustration: Let $X=\{x_1, x_2, x_3, x_4\}$ with respective values 4, 6, 2, 0. Using R=10 we have:

$$x^*_1 = 4^2 \text{ MOD } 10 = 6$$

$$x^*_2 = 6^2 \text{ MOD } 10 = 6$$

$$x^*_3 = 2^2 \text{ MOD } 10 = 4$$

$$x^*_4 = 0^2 \text{ MOD } 10 = 0$$

The ordinal matrix for X:

|       | $x_1$ | $x_2$ | $x_3$ | $x_4$ |
|-------|-------|-------|-------|-------|
| $x_1$ | 0     | −1    | +1    | +1    |
| $x_2$ | +1    | 0     | +1    | +1    |
| $x_3$ | −1    | −1    | 0     | +1    |
| $x_4$ | −1    | −1    | −1    | 0     |

The ordinal matrix for X*:

|       | $x_1$ | $x_2$ | $x_3$ | $x_4$ |
|-------|-------|-------|-------|-------|
| $x_1$ | 0     | 0     | +1    | +1    |
| $x_2$ | 0     | 0     | +1    | +1    |

|       | $x_1$ | $x_2$ | $x_3$ | $x_4$ |
|-------|-------|-------|-------|-------|
| $x_3$ | −1    | −1    | 0     | +1    |
| $x_4$ | −1    | −1    | −1    | 0     |

We record similarity of $\sigma(X, X^*)=10/12=83\%$
Trying with another disruptive algorithm:

$$x^*_i = (x_i+1)^2 \text{ MOD } 11$$

We get $X^*=\{x_1, x_2, x_3, x_4\}=11, 3, 5, 1$
with ordinal matrix:

|       | $x_1$ | $x_2$ | $x_3$ | $x_4$ |
|-------|-------|-------|-------|-------|
| $x_1$ | 0     | +1    | +1    | +1    |
| $x_2$ | −1    | 0     | −1    | +1    |
| $x_3$ | −1    | +1    | 0     | +1    |
| $x_4$ | +1    | −1    | −1    | 0     | with a lower similarity: $\sigma(X, X^*)=7/12=58\%$

Given a reference numeric set one could explore disruption algorithms, D, that would process an input numeric set to one with very poor similarity to it. Alternatively one could use 'brute force' and with trial and error look for a D that would transport an input set to a very dissimilar output set.

This mathematical description is represented in great summary, for the purpose of laying the mathematical grounds for the invented cryptography.

Ordinal Cryptography

Cryptographic practice involves use of a shared secret key. As the key is put to use, and its product, usually a ciphertext, is exposed to an adversary, the identity of this key is progressively vulnerable to extraction. Such threat can be countered by using cryptographic primitives which rely solely on ordinal properties of the shared key. By so doing, even a very clever adversary will at most extract from the use of the key (however intensive) only the infinite list of possible keys that could have been the one used in the cryptographic protocol.

In other words, by limiting the use of a cryptographic key such that only ordinal properties will be used, one maintains unbreachable equivocation as to which of the possible keys that share the same ordinal properties was actually used.

At some point the communicating parties can apply an ordinal disruptor operation on their key, and then use the resultant disrupted key, K* for further applications in the crypto protocol. To the extent that every possible key (from the infinite list of possible keys) is disrupted such that it holds little similarity with the result of applying the disruption algorithm on the ordinal equivalent keys then the adversary will face the persistent equivocation of all possible disrupted keys. Thereby the life of the original (pre-disruption) key is extended. Alternatively, the parties can share a never-used master key, and keep disrupting it to successively used keys, guarding thereby the identity of the master key indefinitely.

We first make the foundational theoretical case for Breaching the Shannon Limit for mathematical secrecy, then we describe the general procedure for ordinal cryptography; subsequently we tie into the continued patent application (U.S. Ser. No. 16/855,517).

Mathematical Secrecy

We describe a case where a cryptographic input regarded as "plaintext", P, is processed into a cryptographic output, regarded as "ciphertext", C, where the process involves the use of a secret key, K: $C=f(P,K)$. Claude Shannon proved that if the key space $\{K\}$ is smaller than the message space $\{P\}$ then a cryptanalyst in possession of C will have more information about P than a cryptanalyst who only knows how large C is. This is regarded as the mathematical secrecy limit.

Shannon proof was based on the efficacy of brute force cryptanalysis. This efficacy is based on the expectation that only one key from the key space will decrypt C into P. In ordinal cryptography an omnipotent cryptanalyst, with perfect knowledge of all pairs of P and C used in the cryptographic process (the cipher), will, at most, be able to identify an infinite series of ordinally equal keys $K_1, K_2, \ldots \rightarrow \infty$.

If now the users will agree on a disruptor algorithm that will disrupt this infinite series of keys into same number of disrupted keys but with widely disparaging ordinal properties, then the omnipotent cryptanalyst will face this variety that would prevent them from extracting P from a known C on the basis of cryptanalysis performed over ciphertexts generated by prior keys.

In one modality after some use of such a disruption key—again only per its ordinal properties—the users will again disrupt the existing key, or the former key, or any other previously disrupted key and again keep the cryptanalyst facing full equivocation as to the identity of the used key, and hence as to their ability to extract P from C. In another modality the users will keep disrupting the same master key into derived keys with little ordinal similarity towards formerly used keys.

Such alternate use and disruption may continue indefinitely, creating a situation where a finite initial secret key is serving its users indefinitely. While the resultant secrecy is not formally equivalent with Shannon mathematical secrecy, it is as close to it as one desires. The difference is that in the ordinal procedure, while a certain ordinal key is being used, it can be cryptanalyzed and some information about it may be learned by the cryptanalyst. This amount of cryptanalytic gain can be accurately appraised by the users, since it is based on combinatorics, and the users decide when and how often to replace the running key with the next one.

As described the size of the ordinal keys may be part of their secret. They may be small or large. Some small keys may be combined to larger ones.

In practice memory limitations and processing limitations will trim this "infinite" series of keys to a finite list, but without a necessary limit, the practical interpretation of infinity.

Ordinal keys are one possibility, we extend this to the broader scheme.

Inherent Key Equivocation

The ordinal option is one possibility. The more general case is where the process P→C can be accomplished via t different keys: $\{K\}_t=K_1, K_2, \ldots K_t$. In that case anyone knowing everything relevant but not the identity of the key, will be unable to decide which of the t keys was actually used. If the same key is used once the cryptanalyst identifies the series $\{K\}_t$, then the cryptanalyst will be successful. But if when this happens the users transform the key they actually use $K_u$ from this infinite series, and create a transformed key $K^*_u$ then, lack of knowledge of $K_u$ will imply lack of knowledge of $K^*_u$. For a proper transformation algorithm the equivocation challenge of $K^*_u$ will be equivalent to the one presented by the virgin key $K_u$.

By repeating this transformation ad infinitum the users achieve an indefinite secure use of a finite key.

Vernam, Vernam+, Vernam++

Vernam cipher offers mathematical secrecy based on bit-wise refreshment of the key. Every next bit of message is encrypted via an unused key bit. As a result Vernam consumes 1 bit of key for every bit of encrypted message.

We define a 'Vernam+' cipher as one where the key, K, is larger than the message, M, and hence the key may be refreshed after being used for m>1 bits of the plaintext message, while maintaining mathematical secrecy. Case in point: the Unary Cipher (https://eprint.iacr.org/2020/389).

We define 'Vernam++' cipher as one where for every triset of, M, K, C (plain message, key, and ciphertext), there are infinitely more keys that match the same M and C, and hence cryptanalysis of such a cipher will limit the key options to an infinite list. If the same key is used for sufficient amount of plaintext then cryptanalysis will nail it down and use this knowledge of K to compromise the next use of same key, K. Alas, if K is derived from a master key $K_m$, using an open derivation algorithm, D, then the infinity of the K series will translate to infinity of options for $K_m$. When $K_m$, now is used as a source to service the next key, K', then the prior knowledge regarding K does not transfer to knowledge of K' because of the 'infinity barrier'—there are infinite number of options for $K_m$ from the point of view of the attacker. Since the same cipher is used, we then have an infinite number of keys that could replace K' for the same pair of M and C. So while with use the identity of K' may be gradually brute force compromised, all this knowledge becomes useless, when K' is replaced with K" the same way that K' was replacing K. This procedure can repeat itself indefinitely and thereby achieves a practical breach through the Shannon limitation: practicing infinite use of a finite key while maintaining secrecy as nearly close to mathematical secrecy as desired. The replacement of keys: K, K', K" can be done after very small use of each key. Ordinal Encryption is a case in point.

This analysis assumes that the key transformations and reverse transformations maintain the full variety of the key identities. In other words there is no asymptotic collapse through these transformation algorithms.

Generic Ordinal Cryptography

Generic Ordinal cryptography serves two parties sharing a key $K_0$.

They do:
1. Extract from $K_0$ a use key, $K_i$ for i=1
2. Use $K_i$ by relying only on its ordinal properties.
3. Repeat steps 1 and 2 after incrementing i→i+1.

By relying only on ordinal properties, (step 2), the users deny an attacker the option to extract from the use of $K_i$ the numeric identity of $K_i$, from which to extract the identity of $K_0$ by reversing the extraction process which was: $K_0 \rightarrow K_1$. The users may hide this derivation process, and keep their attacker further in the dark, but per the analysis herein, even if the derivation (key transformation) algorithm is in the open, the master key $K_0$ cannot be deduced from cryptanalysis of $K_1$ because of ordinal equivocation.

Proof: Let the ordinal procedure above be practiced for i=t rounds. t keys have been used by the parties: $K_1, K_2, \ldots K_t$. The users aware of their level of exposure will stop using a key in favor of the next one "early", but even if they fail to do so, and use all keys for so long that the attacker figures out their ordinal structure, this will leave the attacker with t infinite series of possible keys that would have the same ordinal properties and as such will be indistinguishable for the attacker.

Generally the attacker does not know the size of $K_0$, but even he does, and opts to use brute force to find its identity, that would be futile. There are infinite number of options for $K_0$ that given the extraction procedures to $K_1, K_2, \ldots K_t$ would have a key in each of the infinite series (t infinite series). Say then, that despite infinite use, t→∞, brute force cryptanalysis of the secret $K_0$ is doomed to fail.

This theoretical mathematical secrecy is reduced by the erosion of practice. While there are infinite ordinal sets exhibiting the same ordinal properties, computer memory and other considerations will not allow for infinite size key—true for $K_0$ as well as for $K_1, K_2, \ldots K_t$.

For ordinal encryption there is another security feature.

Ordinal Encryption

When ordinal cryptography is used for encryption then the transformation $K_0 \rightarrow K_i$ may not necessarily be released in the open. Each encrypted message, C, may include the secret parameters how to transform $K_0$ to the next key. This will add difficulties for the attacker. When ordinal cryptography (OC) is used for hashing, for authentication, etc., this option does not present itself.

Implementing Generic Ordinal Cryptography

The shared secret $K_0$ may be constructed via a strong randomness source. It may be shared online with standard security measure—with all the vulnerability thereto, or shared off line, with greater security. It may be written in software, firmware, or hardware. The transformation of $K_0$ to $K_i$ may be carried out through a transformation algorithm D that maps $K_0$ to $K_i$ based on some g transformation parameters $h_1, h_2, h_g$:

$$K_i = D(K_0, h_1, h_2, \ldots h_g)$$

where the g transformation parameters $\{h\}_g$ influence the output $K_i$.

While the algorithm D is arbitrary the values of the g parameters may be randomly picked for a trial and error application, to insure that the growing list of K1, K2, . . . keys is sufficiently diverse (no great ordinal similarity).

SpaceFlipPlus

The continued U.S. patent application Ser. No. 16/855, 517, SpaceFlip, presents cryptographic procedures where the key is a distance matrix between letters of an alphabet. An alphabet featuring l letters defines q=0.5(l)(l−1) mutual distances, $d_{ij}$ between letter $L_i$ and letter $L_j$ of the used alphabet. Each distance is identified by the two letters it connects and its numeric value. So the q distances represent a numeric set, Q.

The numeric set Q is used per its ordinal properties only for all the protocols and procedures presented. Therefore even a very smart and very capable cryptanalyst will only identify, at most, the infinite number of ordinally equivalent sets that will give the same outcome as the set that was actually used.

The users would share a master key $K_0$. They will derive from it a series of keys $K_1, K_2, \ldots$, use each key for a prescribed measure, and then switch to the next key. Because the keys are used only per their ordinal properties, then any degree of cryptanalysis accomplished by an attacker on the usage of keys $K_1, K_2, \ldots K_t$, will be of no use, and of no value when the users switch to key $K_{t+1}$. And thereby the master key $K_0$ will serve the users indefinitely.

SpaceFlip Illustration

Alice and Bob use a five letters alphabet $L_1, L_2, L_3, L_4, L_5$ in conjunction with a SpaceFlip cipher. They share the following 5*5 master key ($K_0$):

|    |    |    |    |    |
|----|----|----|----|----|
| 0  | 8  | 11 | 5  | 15 |
| 8  | 0  | 7  | 12 | 6  |
| 11 | 7  | 0  | 5  | 10 |
| 5  | 12 | 5  | 0  | 9  |
| 15 | 6  | 10 | 9  | 0  |

They decide to derive from $K_0$ the first use key, $K_1$ based on a generic key transformation formula where distance between any two letters of the used alphabet, $d_{ij}$ (distance between letters $L_i$ and letter $L_j$) is derived via a formula of three parameters:

$$d_{ij} = D(m_{ij}, u, v, w)$$

where $m_{ij}$ is the distance corresponding to $d_{ij}$ in the master key, and u, v, and w are arbitrary numeric values. D—is the disruption operator that disrupts (transforms) the mater key.

Alice and Bob further decide to implement the disruptor function D as follows:

$$d_{ij} = (m_{ij} + u) * \text{MOD } w + 1$$

For $K_1$ Alice and Bob use u=4, v=1, w=14 and hence ($K_1$):

|    | L1 | L2 | L3 | L4 | L5 |
|----|----|----|----|----|----|
| L1 | 0  | 13 | 2  | 10 | 6  |
| L2 | 13 | 0  | 12 | 3  | 11 |
| L3 | 2  | 12 | 0  | 10 | 1  |
| L4 | 10 | 3  | 10 | 0  | 14 |
| L5 | 6  | 11 | 1  | 14 | 0  |

Alice approaches Bob claiming to be Alice. Bob then wishes to authenticate Alice, so he challenges her to identify the end of a figure (y) defined as; y=FIGURE(x, $r_1$, $r_2$)=FIGURE(L3, 2, 1)

Alice then applies the NEXT function to L3: L5=NEXT(L3). And again L1=NEXT(L5). She then identifies the next element to L1: L3=NEXT(L1). Alice communicates to Bob: y=L3. Bob then concludes that he is talking to Alice since it appears she is in possession of $K_1$.

Since the key is small Alice and Bob decide to switch to $K_2$ right away. Alice selects random values to u, v, and w. u=1, v=2, w=17:

$$d_{ij} = (m_{ij} + 1)^2 \text{ MOD } 17 + 1$$

So ($K_2$):

|    | L1 | L2 | L3 | L4 | L5 |
|----|----|----|----|----|----|
| L1 | 0  | 10 | 10 | 3  | 16 |
| L2 | 10 | 0  | 17 | 17 | 8  |
| L3 | 10 | 17 | 0  | 3  | 5  |
| L4 | 3  | 17 | 3  | 0  | 5  |
| L5 | 16 | 8  | 5  | 5  | 0  |

Now it is Bob who approaches Alice to prove his identity, and Alice randomly defines a figure: y=FIGURE(x, $r_1$, $r_2$, $r_3$)=FIGURE(L2, 1, 2, 1).

Now Bob computed L5=NEXT(L2). When it comes to finding next to L5 both L3 and L4 compete. So one checks the NEXT for both. It turns out that L4=NEXT(L3) and L3=NEXT(L4), so according to the Next equivocation resolution NER Alice and Bob agreed upon, both are disqualified and L2 becomes L2=NEXT(L5). Then L5=NEXT(L2), but L5 is disqualified since it is part of the LINE so the NEXT letter of the 2nd line is L1. Bob then computes L4=NEXT (L1), and reports to Alice: y=L4. This answer convinces Alice that Bob is who he says he is because he appears to be in possession of $K_2$.

An attacker who somehow figures out $K_1$, will interpret Alice challenge as: L3 (L2→L4; L4→L2→L5; L5→L3), and will not pass the test.

In practice the size of the alphabet may be much larger than 5, and the confidence in the test is greater. For small alphabets the test can be carried out several times.

Flatness Management

Given an alphabet A comprised of n letters, the respective ordinal key will be comprised of q=0.5n(n−1) numbers. The ordinal key is associated with a respective ordinal image. If the ordinal key is with zero flatness, then its ordinal image has no zeroes. $\varphi = z/q = 0$. This means that all the numbers in the ordinal key are different from each other. This in turn means that there are q! different keys. For alphabet A being Base64 we have q=0.5*64*63=2016. And 2016!=2.325849581 E+5788 is the size of the key space. This very large number may be further enlarged by increasing flatness to optimal levels.

Now we consider flatness. Let w numbers be featured with repetition: $r_1, r_2, \ldots r_w$. The remaining (non duplicating numbers) will be ordered in $(q-\Sigma r_i)!$ ways. The i-th duplicate will have $C^{r_i}_{q'_i}$ ways to be assigned to the remaining locations, where $$q'_i = q - \Sigma r_j \ldots \text{ for } j=1,2, \ldots (i-1),$$

leading to a much larger hurdle for brute force cryptanalysis:

[Partial Flatness Key Space]=$(q-\Sigma r_i)! * \pi(C^{r_i}_{q'_i})$

In summary some flatness increases the key variability. Although too much flatness will choke it. In the extreme, for w=1, and $r_w=q$, the key space collapses: {K}=1

Forever Key Cryptography

A Theoretical and Practical Framework to Extend the Service of a Cryptographic Key Indefinitely The longer one uses a cryptographic key, the higher the accumulated probability for a successful cryptanalysis thereof. A simple way to counter this erosion is for the users to share a master key from which to derive a succession of use-keys that are replaced before they are being compromised. While this measure does slow the attack, the accumulated cryptanalytic gains eventually chip away the secrecy of the master key. Presenting a means to shield the master key from its attacker: key equivocation cryptography (KEC). Observing a set comprising a cryptographic input, I, a cryptographic output, O, and a key K that operated on either I, or O to generate the other. We define cryptographic functions, "Key Eavuivocation Encryption" (KEE), and "Key Equivocation Decryption, (KED), as encryption and decryption functions respectively such that there is another key, K'≠K that matches I to O and O to I the way K does. We further define "complete key equivocation cryptography, (cKEC) as KEC where there are infinite number of keys that match the same cryptographic input, I, and cryptographic output, O. We show that cKEC will shield the master key from cryptanalytic erosion indefinitely, and we present "ordinal cryptography" as a practical embodiment of this theoretical construct. This technology is critical for instances where one communication station is beyond easy or possible access for key replacement, including: far off climate sensors, orbiting satellites, implanted medical devices, etc.

SpaceFlipPlus Authentication

The environment: two mutually remote stations sharing a secret key $K_0$ are every so often reaching out to each other to establish secure communication. They wish to convince one another that they are not talking to an identity thief. They do so via an identity-proving dialogue which hides the identity of $K_0$ so that even after practicing such an identity-proving dialogue as many as desired times, no attacker will be able to extract the identity of $K_0$.

The described procedure SpaceFlipPlus is based on the SpaceFlip procedure, described in the continued application (U.S. patent application Ser. No. 16/855,517), operated as follows:

1. A Key derivation operator D is applied to $K_0$ to extract $K_i$ for i=1
2. $K_i$ is used an arbitrary $t_i$ times via the SpaceFlip dialogue for the two stations to mutually prove themselves to the other.
3. Incrementing i to i+1, and repeating steps 1 and 2 for as long as needed.

Schematically, for r→∞:

$$[K_0 \to K_1][t_1 \text{ times use of } K_1][K_0 \to K_2][t_2 \text{ times use of } K_2] \ldots [K_0 \to K_r][t_r \text{ times use of } K_r]$$

The two communicating stations are each equipped with a good source of randomness.

Key Derivation

SpaceFlipPlus authentication is based on a distance matrix connecting n letters of some alphabet A. Such alphabet is connected via $q=0.5n(n-1)$ distances. The distances are real positive numbers. The distance from any letter to itself is regarded as zero. Using a source of randomness the two communicating stations agree on a shared key $K_0$ in a form of a list that defines q randomized values: $m_{12}$, $m_{13}$, ... $m_{n,n-1}$. These q values are the shared secret which the SpaceFlipPlus procedure is designed to preserve despite repeated use.

The objective ahead is to derive keys $K_1$, $K_2$, ... use these keys to the extent which will provide insufficient information to allow an attacker to identify the used key per its ordinal setting. However, the users will opt to replace each used key such that the information gleaned from all keys used so far, will not be usable or relevant to the attempt to crack the next key. In other words the SpaceFlipPlus procedure is designed to create an information dam between previously used derived keys and presently used derived key, and that despite the fact that all these keys are derived from the same master key, $K_0$. This can be achieved via a smart derivation algorithm D that would insure that the ordinal settings of the derived keys are sufficiently different.

After using i keys $K_1$, $K_2$, ... $K_i$, the procedure will identify a derivation algorithm $D_{i+1}$ leading to $K_{i+1}$ with sufficiently low ordinal similarities versus the former i keys:

Key Derivation Requirement: $\sigma(K_{i+1}, K_j) < \text{SIM}_{max}$ for j=1,2,... i where $\text{SIM}_{max}$ is a preset similarity threshold.

One strategy to meet the key derivation requirement is: 'Randomized Modulation'.

Randomized Modulation Key Derivation

This procedure is based on a selected formula where entries from the master key $K_0$ will be processed with some arbitrary selected parameters, $(r_1, r_2, \ldots)$ where at least one of these parameters is MOD base. Examples:

$$k_{ij} = r_1 * (m_{ij} + r_2)^{r_3} \text{ MOD } r_4 + 1$$

This formula is in the form $k_{ij} = D(m_{ij}, r_1, r_2, r_3, r_4)$, where $r_1, r_2, r_3, r_4$ are four arbitrary selected parameters; $m_{ij}$ is the value of the master key representing the distance between letter $L_i$ and letter $L_j$ in the master key, $K_0$, and $k_{ij}$ is the value of the distance between the same letters in the derived key.

Any number of such formulas may be used with the final entry $k_{ij}$ is the sum total of the individual $k_{ij}$ computed from several selections of randomized $r_1, r_2, r_3, r_4$ values.

The derivation requirement will be met selecting randomly a set of values $r_1, r_2, r_3, r_4$, and using it to build $K_{i+1}$. Subsequently the key deriver will compute the ordinal similarity index between the newly constructed $K_{i+1}$, and all the previous i keys. This will generate i similarity values. If any of these similarity values exceeds the arbitrary set $\text{SIM}_{max}$ threshold then this particular $K_{i+1}$ is disqualified, and the key deriver is randomly selecting a new set of $r_1, r_2, r_3, r_4$ values then repeats the similarity test. As long as the test is failing a new randomly selected set of $r_1, r_2, r_3, r_4$ parameters will be picked. It is straight forward to compute and ascertain that for a sufficient size alphabet (sufficiently high value of n), there will be sufficient keys that will be sufficiently ordinally dissimilar from each other to meet the derivation requirement.

The derivation requirement is necessary in order to achieve the goal of information barrier from cryptanalytic gains over the first i keys, so that they don't weaken the strength of key, $K_{i+1}$.

Key Usage

The environment: one of the two communicating stations calls upon the other to establish communication under the assumption that they talk to whom they believe they talk to and not to an identity thief. They will mutually establish this trust by alternatively one station playing the role of the identity prover, or "prover" and the other will play the role of identity-verifier, or "verifier".

The prover will call upon the verifier to issue a "spatial challenge"—namely a challenge based on awareness of the "space" between the agreed upon letters of the used alphabet. The space where the n letters of the used alphabet are 'sitting' is defined via the $q=0.5n(n-1)$ distances as expressed in the current key K.

A typical challenge issued by the verifier will be a FIGURE defined by an arbitrary sequence of g lines: $\text{LINE}_1$, $\text{LINE}_2$, ... $\text{LINE}_g$. The figure begins with letter x and ends with letter y. $\text{LINE}_1$ is a line that begins with letter x and is stretched over $z_1$ letters by applying the NEXT function over x $z_1$ times, according to the LINE definition in the continued application. This defines an end letter $x_i$. $x_i$ in turn serves as the starting letter for $\text{LINE}_2$ and is $z_2$ letters long. Similarly line by line the FIGURE is constructed and ends with letter $x_g = y$.

The verifier selects x, and the value of integer g, randomly.

As to selection of $\{z\}_g = z_1, z_2, \ldots z_g$ the verifier will randomly pick g positive integers: $z'_1, z'_2, \ldots z'_g$ of any size: randomly (unilaterally), and communicates these selections to the prover:

Verifier to Prover: $x, z'_1, z'_2, \ldots z'_g$

The values $z'_i$ will be mapped into the corresponding $z_i$ as follows:

$$z_i = z'_i \text{ MOD}(n-1) + 1 \text{ for } i=1,2,\ldots g.$$

Thereby hiding the value of n from the attacker, and allowing for full range of randomness to apply.

The prover and the verifier, each will use their knowledge of the current key K and compute x→y. The prover will then communicate the identity of y to the verifier. The verifier will reject the would be prover if the answer is wrong. The protocol may call for another try or to a final rejection. If the answer of the prover is right then the verifier will either be satisfied and regard the other party as bona fide, or decide to run another randomized test as above and so on, as many times as desired, to calm any apprehension on the part of the verifier before admitting the other party as the party it claims to be.

Once successfully accomplished, the roles may reverse, the prover becomes the verifier and the verifier becomes the prover so each party verifies the identity of the other.

This cross verification applies only to the present session. Once the session is terminated and a new one begins, the above procedure repeats itself The selection being fully random it is not necessary to verify that no prior verification session has taken the same or very similar randomized pattern, but such test viz a viz past tests may always be taken.

SpaceFlipPlus Encryption

The overall procedure for SpaceFlipPlus encryption is similar to SpaceFlipPlus authentication. Keys are used and serially replaced to keep the degree of secrecy at the desired level. The difference is in the fact that with encryption the working key is used more extensively, and each time it is being used it provides raw material for cryptanalytic attack, it may be that for long communication sessions, keys will have to be switched to the next in the middle of a long transmission.

On the other hand Ordinal Encryption allows the users to encrypt the derivation parameters (the ordinalization disruption algorithm) for key derivation algorithm $D_{i+1}$ in the encrypted message where key $K_i$ is used. Thereby denying the cryptanalyst the identity of the derivation algorithms.

Randomized FIGURE Encryption

Given an alphabet A comprising n letters, $L_1, L_2, \ldots L_n$, two communicating partners agree on a "space" for the alphabet, namely on a set of $q=0.5n(n-1)$ distances between each letter to each other, where the distance between a letter to itself is zero, and all distances are positive real numbers.

A partner will transmit to the other partner a letter $X \in A$ as follows:

The transmitter will: 1. Randomly select a letter $Y \in A$.

2. Arbitrarily select two integers $g_l$, and $g_h$—the minimum and maximum number of LINES to build a FIGURE 3. Randomly select a value l between $g_l$ and $g_h$ 4. Randomly select l−1 values in the range 1 to (n−1): $t_1, t_2, \ldots t_{l-1}$ 5. Define a FIGURE, FIG. 1, with Y as a starting letter, and (l−1) LINEs defined with $t_1, t_2, \ldots t_{l-1}$.

6. Compute Y'=FIG. 1(Y, $t_1, t_2, \ldots t_{l-1}$)

7. Build a LINE starting with letter Y', do: repeatedly apply NEXT to Y', until, after $t_l$ applications of NEXT on Y' the result is X: X=LINE(Y', $t_l$). Make sure the LINE has no duplicate letters.

8. Define FIGURE FIG. 2 as X=FIG. 2(Y, $t_1, t_2, \ldots t_l$)

9. Communicate FIG. 2 to the receiving partner as follows:

(i) send letter Y (ii) for i=1, 2, . . . l, randomly select an integer k in the range 0 to some arbitrary limit, then compute: $w_i$ k*n+$t_i$, (iii) send to the recipient by order $w_1, w_2, \ldots w_l$ The receiving partner will use the shared space (the shared key) to compute FIG. 2 and identify X as the plaintext letter sent to them encrypted via FIG. 2. The recipient, aware of the value of n, will extract $t_i$ from the respective $w_i$: $t_1$=$w_i$ MOD n.

The transmitting partner will send any size message letter by letter to the receiving partner. The partners can reverse rolls and thereby conduct a conversation.

Figure 1:
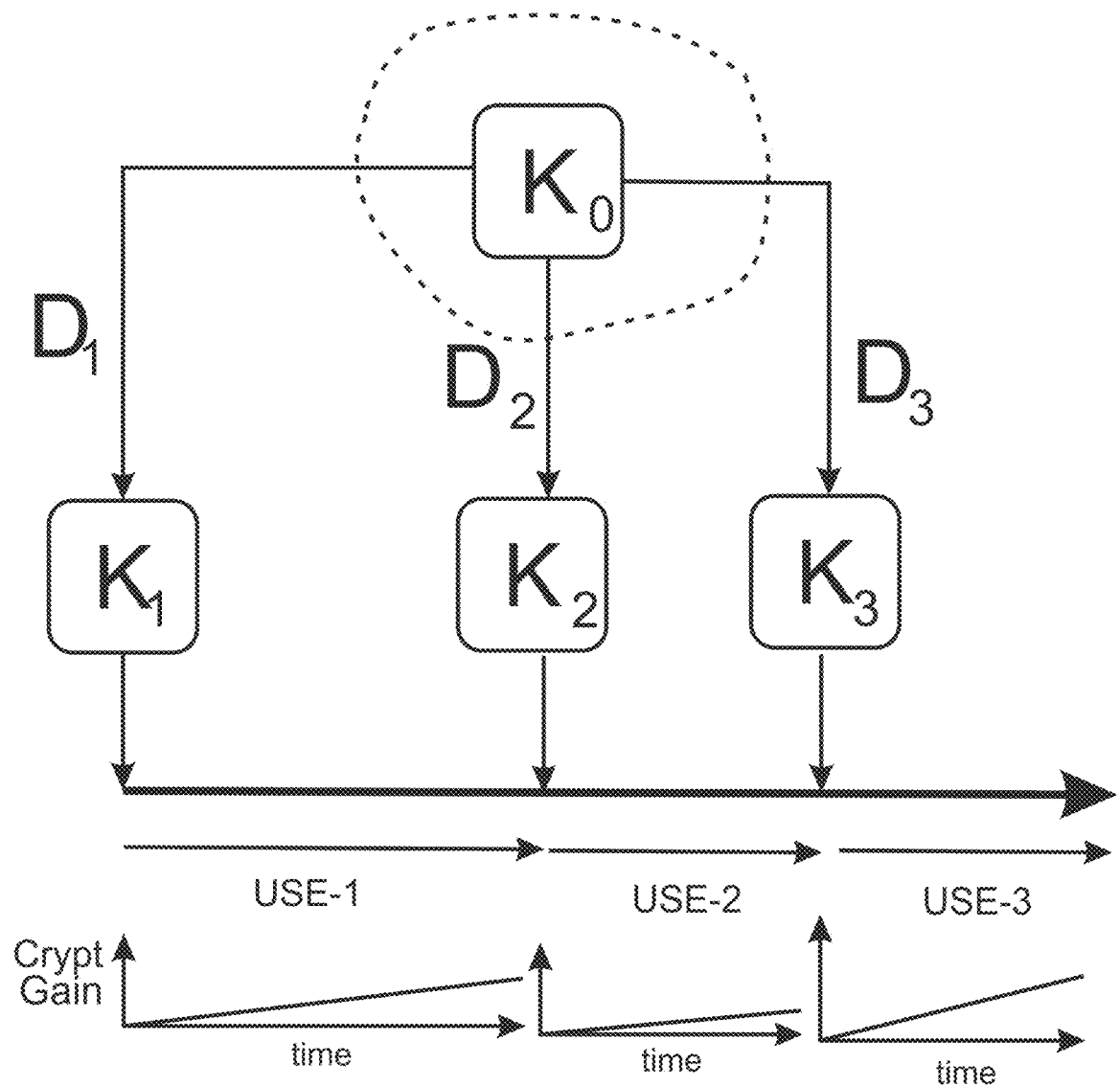
FIG. 1: Ordinal Cryptography Protocol

With sufficiently large values for n and $g_l$ and $g_h$, the randomized selection of FIG. 1 will insure that for the life of the key, there will be no repetition of FIG. 2. However, the parties may maintain a log of FIG. 2 used before, and if the randomized selection generates a duplicate, then, this duplicate is dropped and the randomized selection is tried again.

The higher the values of $g_l$ and $g_h$ the greater the cryptanalytic burden, but the larger the size of the ciphertext relative to the plaintext. The user will determine the values of $g_l$ and $g_h$ according to the sensitivity of the encrypted material and the threat thereto. So when passing super sensitive cryptographic keys or text, the values of $g_l$ and $g_h$ will be high. When encrypting say audio or video stream it may be made vary low, say $g_l$=1, $g_h$=3.

One could also use small FIGURES as a baseline with occasional large FIGURES, and less frequently very large FIGURES, according to counter-cryptanalytic analysis.

Alphabet Selection

The size of the alphabet, n, is arbitrary. One may be inclined to use nominal alphabet where $n=2^w$, for w=1, 2, . . . . Such nominal alphabet may be expressed by the exhaustive list of distinct permutations of w bits. Accordingly an arbitrary stream of bits will be interpreted as a series of letters of the selected alphabet wherein every w bits will represent a letter. All letters of the stream will be encrypted one by one, and at the receiving end decrypted one by one so that the original stream will be reconstructed at the receiving end.

Distance Range

There are several design options for expressing the distances between the letters. In one specific application of SpaceFlip, the distance is of the same size as the letter, namely w bits per distance value. This will impose a high degree of repetition since there are $0.5*2^w*(2^w-1)$ entries and only $2^w$ distinct values. Such restriction is not required for the encryption method described here. So the distance range may be 0- to $2^u$ for u smaller, or more likely larger than w. If u is adjusted to be u=2w−1, then the distance matrix may be fitted with non-repeat distances. This will also prevent any NEXT equivocation. However, if u>2w−1 then there is more room for numeric variety to further confuse the cryptanalyst.

A typical example is Base64 for which w=6. The working key (the 'space') will be comprised of 0.5*64*63=2016 numbers. Taking the bit size of the distance values to be u=2w−1=2*6−1=11, then the key will be of size 2016*11=22176 bits.

The user may wish to hide the value of n by using modular arithmetic. Accordingly bit expression of the alphabet will be expanded.

This method calls for the transmitter to transmit a FIGURE to the recipient. It is done by identifying a starting letter X, and size count for some l LINES comprising the FIGURE. Those LINE size counts range from 1 to (n−1). So to define a FIGURE the transmitter will have to send off (l+1) bit strings of fixed size w bits each, a total bit count for a FIGURE of (l+1)w bits: w bits are needed to identify the input letter for the FIGURE and l*w bits will be needed to specify the LINES the FIGURE is comprised of. The attacker will very soon realize that all the FIGUREs have a bit count that divides by w, and find the size of n. To prevent this one can add d decoy bits to the necessary w bits. Now every number is comprised of (w+d) bits covering a range of up to $2^{w+d}$ numbers.

This will allow the users to make use of modular arithmetic. The starting letter in the figure, y, may be delivered to the recipient as y' where y'=y+n*k, where k is an integer small enough so that y' can be written in binary string comprising (w+d) bits. The recipient will readily extract the letter represented by y from the value of y'.

Similarly the integers for the line sizes $t_1, t_2, \ldots t_l$ will be communicated to the recipient using values $t'_1, t'_2, \ldots t'_l$ where:

$$t_i = t'_i \text{ MOD}(n-1)+1$$

This will assure that the range for $t_i$ (i=1, 2, ... l)) is from 1 to (n−1).

Illustration: Let the alphabet be defined by Base64 and let us use d=3 decoy bits. So each letter and each LINE size will be expressed in 6+3=9 bits. If the first line of a FIGURE is 6 letters long, (6 steps from the original letter), then instead of writing $t_1$=6, the transmitter will write 194 which in 9-bits binary string is 011000010. The recipient will interpret 194 as 6:

$$6 = 194 \text{ MOD}(64-1)+1$$

Illustration: a transmitter and a recipient operate on a Base64 alphabet. The transmitter wishes to pass to the recipient a FIGURE defined as:

$$X = \text{FIGURE}(L_5, t_1, t_2, t_3) = \text{FIGURE}(5,23,14,8)$$

This FIGURE can be transmitted directly as follows:

FIGURE: 000101 010111 001110 001000

Or by adding 2 decoy bits d=2 the figures could be delivered using modular arithmetic over MOD 64, for the starting letter, and via MOD 63 over the LINES data.

$$X = \text{FIGURE}(L_5, t_1, t_2, t_3) = \text{FIGURE}(5,23,14,8) = \text{FIGURE}(133,85,202,70)$$

with a corresponding bit string:

FIGURE=10000101 01010101 11001010 01000110

Now the attacker will have to consider the following values for n: 9,8,7,6,5,4,3,2

The intended recipient will have no difficulties to interpret the 8 bits strings with modular arithmetic, and extract the definition of the figure, then evaluate it to the letter it points to.

Alternatively the users may use 2 bits to express one content bit so we have 0→01 and 1→10, leaving 00 and 11 to be used as delimiter between numeric values and between FIGUREs which can be sent out at any size.

Illustration: the FIGURE x=FIGURE(22, 7, 13) will be written as:

00 10 01 10 10 01 11 10 10 10 11 10 10 01 10 00 where the first and last string of '00' represent the start and the end of the FIGURE, the two substrings '11' inside represent the boundary of transmitted three numbers, and every pair 10 represents the bit 1 and every pair 01 represents the bit 0.

Streaming

Using the fixed size number to transmit the starting letter Y and the integers $t_1, t_2, \ldots t_l$, there is no need to identify where one number begins and the other hand. Alas, there is a need to identify the end of one FIGURE (transmitting of one letter) and the beginning of the next FIGURE (transmitting the next letter).

This can be done on the basis of the fact that the range for the $t_i$ values is $1 \leq t_i \leq (n-1)$. It means that a line definition, $t_i$ will never be all zeroes. Therefore the $t_i$ (or t+d) zeroes can be used to mark the boundary between FIGURES.

Illustration: the transmitter sends three letters from alphabet A to the recipient, defined as:

FIGURE(5,23,14,8),FIGURE(14,11),FIGURE(34,8,9)

as:

00101 10111 001110 001000 000000 001110 001011 000000 100010 001000 001001

There will be no confusion for the case where the starting letter will be all zeros. It will be detected as two consecutive strings of zeros.

NEXT Equivocation Resolution

The case where two or more letters have the same smallest distance from a current reference letter requires a resolution. One way is to identify the next letters for each candidate for the original NEXT and select the one whose NEXT distance is the smallest. If equivocation continues then this resolution strategy continues. If it is done to exhaustion and the equivocation is not resolved then this operation may be declared unresolved and is replaced with another.

Another way is to choose the next by centrality characteristics of the candidates. For example choosing the letter which is most central based on the current space (key). Centrality of a letter is defined as the sum total of the distances of that letter to all other n−1 letters.

Yet another resolution strategy is to drop the competing NEXT candidates and choose among the remaining letters the one with the smallest distance from the current letter.

One could limit the space to non-repeat values, namely:

$$d_{ij} \neq d_{uv}$$

for all i,j,u,v=1, 2, ... n combination, where $d_{ij}$ is the distance from letter $L_i$ to letter $L_j$.

In that case no equivocation will present itself.

This Next Equivocation Resolution is applicable to Authentication and to any other use of the Ordinal Cryptography.

Unresolved NEXT

If the measures taken to resolve NEXT-equivocation are not successful then the eventual resolution of this situation may be through: (1) "choose again", and (2) duplicate distance elimination.

1. "Choose Again": if the NEXT is being computed from a randomly chosen FIGURE then the users can choose another FIGURE.

Illustration: The verifier randomly defines a FIGURE for the prover to prove their identity. As they compute the FIGURE they encounter an resolved NEXT. The prover will then request another challenge to be issued by he verifier. And then another one, if necessary, until one is found where the equivocation is resolved.

It may be, for very flat cases, that most if not all the FIGURES will encounter an unresolved NEXT. In the extreme cases where all the distance values are equal: $d(L_i, L_j) = d(L_u, L_v)$ for all i,j,u,v=1, 2, ... n the ultimate resolution will come through 'duplicate distance elimination.

2. Duplicate Distance Elimination: this method takes any distance matrix and eliminates all duplicate values therein, thereby eliminating any possibility of equivocation. There are several methods to eliminate duplicates. One such method is as follows:

1. Agree on a shared randomized order to examine the $q = 0.5 * n * (n-1)$ distance values.

2. Examine those values one by one according to the agreed upon order. Any distance value which is a duplicate of a value so far, will be incremented by one. If the resultant value is a duplicate of a previously examined distance value then again, increment by one. Keep incrementing until no duplicate is found.

3. Continue to examine the next distance value according to the procedure in (2) following the agreed upon order in (1).

When these steps are applied to all the distance values in the distance matrix, the resultant matrix is duplicate free.

The communicating parties will jointly decide to rid their shared use key from duplicates according to pre-agreed procedure like the above.

Illustration: For n=5 the following distance matrix is full of duplicates; choosing a simple order, counting line by line, column by column.

|   | A | B | C | D | E |
|---|---|---|---|---|---|
| A | 0 | 1 | 3 | 1 | 4 |
| B | 1 | 0 | 4 | 2 | 4 |
| C | 3 | 4 | 0 | 1 | 2 |
| D | 1 | 2 | 1 | 0 | 4 |
| E | 4 | 4 | 2 | 4 | 0 | will be un-duplicated into:

|   | A | B | C | D | E |
|---|---|---|---|---|---|
| A | 0 | 1 | 3 | 2 | 4 |
| B | 1 | 0 | 5 | 6 | 7 |
| C | 3 | 5 | 0 | 8 | 9 |
| D | 2 | 6 | 8 | 0 | 10 |
| E | 4 | 7 | 9 | 10 | 0 |

It is important to select a randomized order to increment the values one by one, otherwise the cryptanalyst receives an important clue.

Flat Islands

Given an alphabet A with n letters $L_1, L_2, \ldots L_n$, and a respective ordinal key, K with $q=0.5n(n-1)$ numbers, let s of those numbers have the same mutual distance, $\Delta$, between each pair of them: $[i,j]=d(i,j)=z$ for $i,j=1, 2, \ldots s$. If the other q−s numbers are all different then the key will have flatness:

$\varphi=0.5s(s-1)/0.5q(q-1)=s(s-1)/q(q-1)$

If $\Delta$ is the smallest number in the key: $\Delta=(k_{ij})_{min}$, for $i,j=1, 2, \ldots n$, where $k_{ij}$ is the entry in row i and column j in the ordinal key, K, then the above described iteration based NEXT equivocation resolution (NER) procedures will fail to distinguish between these s numbers with mutual minimum distance. Such s numbers will be called a 'flat island'.

Applications

In many instances off line key replacement is quite simple, like between branches of a bank. But in other cases one or more communication stations are indisposed towards key replacement. In all those cases this ordinal cryptography, or more generally the 'forever key cryptography' will come very handy.

Some situations:

1. remote devices 2. medical implants 3. satellites 4. intelligence gathering 5. mediated applications, 6. Unshared Key Cryptography.

Randomized Key Generation

The normal way to select a secure ordinal key for alphabet A comprising n letters is to use an ad-hoc randomness source to pick up $q=0.5n(n-1)$ numbers. The randomness source will pick values from 1 to a high limit, $\theta$. IF $\theta \gg q$ then the chances for duplicates are small. If $\theta<q$ there will be duplicates in the key, and the more so the lower the value of $\theta$. This implies that the key generator could control the expected level of flatness simply by setting up the randomness range (1-$\theta$).

One could also control the level of flatness in a given key, raising it or lowering it, as desired. Duplicate values in the key matrix lead to NEXT equivocation issues that are resolved by iterative application of the prevailing 'Next equivocation resolution' procedure—which involves more data from the key and presents a bigger cryptanalytic hurdle.

We discuss (i) increasing flatness, and (ii) lowering flatness. First in a unilateral way:

Increasing Flatness Procedure

1. Randomly select a first value in the key, x. If the value of x is not unique, drop it and select another.

2. Randomly select a second value in the key, y. If the value of y is not unique, drop it and select another.

3. change the value of x to the value of y.

Repeat as necessary.

Decreasing Flatness Procedure

1. Randomly select a number in the key, of value x. If the value of x is unique, drop it and select another.

2. Increment the value of the selected number in the key: x to x+1;

3. If (x+1) is not unique, increment again (x+1) to (x+2) and return to step (2).

Repeat as necessary.

Adjusting Flatness Procedure: given an ordinal key (q=0.5n(n−1)) entries over an n×n matrix. Do:

1. specify the desired level of flatness $\varphi^*$
2. evaluate the degree of flatness in the key, $\varphi$.
3. If $\varphi>\varphi^*$ then apply the decreasing flatness procedure; if $\varphi<\varphi^*$ then apply the increasing flatness procedure; if $\varphi=\varphi^*$, stop.

Coordinated Flatness Adjustment

The above procedure will be readily used on a unilateral basis. However, flatness control is important as a cryptanalytic obstacle, and to bring it to full power it is necessary to devise coordinated flatness adjustment to be carried out by the two communicating parties, as part of the ordinal disruption step (the algorithm that derives the use key from the shared master key).

Coordinated flatness adjustment will proceed as follows:

Given a shared key, do:

Flatness Increase Procedure:

Let K be the shared key which the two communicating partners wish to increase the flatness for. They will both do:

1. Identify the value x in K, which is the highest value without a duplicate.

2. Identify the value y, in K, which is the second highest value without a duplicate.

3. Set the element of value x to be of value y.

This procedure may be extended as follows. Let b be a duplication base (b=1, 2, . . . ), do:

1'. Identify the value x in K, which is the highest value without the key having b+1 or more elements of equal value, x.

2'. Identify the value y, in K, which is the second highest value without the key having b+1 or more elements of equal value, y.

3'. Set all the key elements of value x to be of value y

This procedure can be applied successively for b=1, 2, ... up to total flatness: φ=1 ....

It is a bit more complicated to decrease flatness. Therefore flatness adjustment will be carried out by:

1. Generating a shared key with zero or minimal flatness φ→0

2. Applying the shared increase flatness procedure above time and again. Computing the resultant flatness every time, until the desired flatness is achieved.

Illustration: for an alphabet A comprised of 5 letters, the ordinal key will comprised of 0.5*5*4=10 numbers. The parties will agree on counting the numbers row by row and column by column, then use a randomness source to generate 10 random numbers. The randomness range will be high enough so that there will be no duplicates. If there are duplicates in the generated numbers then, a new randomness round will be effected. Say the result of the 10 elements of the key (without duplicates) will be: (using a randomness generator from 1 to 80).

56, 8, 12, 47, 3, 72, 21, 22, 55, 9

Flatness: φ=z/(0.5*9*10)=0/45=0

One aims to increase flatness to about φ=30%. Applying the above procedure (b=1):

the highest value to change is 72, the next is 56, so the key now looks:

56, 8, 12, 47, 3, 56, 21, 22, 55, 9

Now the flatness φ=1/45=2.2%. So we continue: the highest value with no duplicate now is 55 and the second one is 47. The key now looks:

56, 8, 12, 47, 3, 56, 21, 22, 47, 9

Now the flatness φ=2/45=4.4%. So we continue: the highest level with no duplicate is 22 and the next is 21 so the key now looks like:

56, 8, 12, 47, 3, 56, 21, 21, 47, 9

Now the flatness φ=3/45=6.6%. So we continue with 12 and 9:

56, 8, 9, 47, 3, 56, 21, 21, 47, 9

Now the flatness φ=4/45=8.8%. So we continue with 8 and 3:

56, 3, 9, 47, 3, 56, 21, 21, 47, 9

Now the flatness φ=11.1%. We cannot continue with b=1, so we increment to b=2. The two highest values are 56 and 47. The key now looks:

47, 3, 9, 47, 3, 47, 21, 21, 47, 9

The 4 '47' numbers contribute 6 '0' to the ordinal image of the key, the 21, 9, and 3 contribute one '0' each to a total of 9 zeros in the ordinal image. Resulting in φ=9/45=20%. We continue with 21 and 9:

47, 3, 9, 47, 3, 47, 9, 9, 47, 9 where φ=13/45=29%. The ordinal key will look like

|    | L1 | L2 | L3 | L4 | L5 |
|----|----|----|----|----|----|
| L1 | 0  | 47 | 3  | 9  | 47 |
| L2 | 47 | 0  | 3  | 47 | 9  |
| L3 | 3  | 3  | 0  | 9  | 47 |
| L4 | 9  | 47 | 9  | 0  | 9  |
| L5 | 47 | 9  | 47 | 9  | 0  |

And accordingly LINE(L3,3) will be evaluated first to NEXT(L3): we have two candidates L1 and L2. L1 and L2 form an "ordinal island" they refer to each other as the closest, so one drops them both from consideration. Leading to L4=NEXT(L3). Evaluating NEXT(L4): L1, L3, and L5 share the smallest distance, 9. L1 and L3 share the smallest distance of 3 and they form an island, so L5=NEXT(L4). Continuing with L5: NEXT(L5)—there are two candidates L2 and L4 (both min distance 9). But the distance from L2 to L3=NEXT(L2) is 3, which is less than the distance from L4 to L5=NEXT(L4) which is 9, so L2=NEXT(L5). We computed: L3→L4→L5→L2:

L2=LINE(L3,3)

The same line over the zero flatness key will be as follows. Here is the key:

|    | L1 | L2 | L3 | L4 | L5 |
|----|----|----|----|----|----|
| L1 | 0  | 56 | 8  | 12 | 47 |
| L2 | 56 | 0  | 3  | 72 | 21 |
| L3 | 8  | 3  | 0  | 22 | 55 |
| L4 | 12 | 72 | 22 | 0  | 9  |
| L5 | 47 | 21 | 55 | 9  | 0  |

And NEXT(L3)=L2 (no equivocation), NEXT(L2)=L5 (no equivocation), NEXT(L5)=L4 (no equivocation), and hence: L3→L2→L5→L4:

L4=LINE(L3,3)

Use Key Derivation Protocols

The environment: two communication partners sharing a master key $K_0$ which has been used some t times, generating keys $K_1, K_2, \ldots K_t$, wherein the partners wish to extract the next use key, $K_{t+1}$, to be totally secret, and used as effectively as possible, and doing all that while protecting the integrity of the master key.

If the partners use SpaceFlipPlus encryption they can hide the next derivation algorithm in the previous encrypted message, but we analyze security under the assumption that the adversary finds out the details of the derivation algorithm $D_{t+1}$, but is unaware of the composition of the master key.

We describe a protocol comprising three stages: (i) modular key derivation formula, (ii) flatness adjustment, (iii) similarity examination.

If the similarity examination fails, the parties search for a new derivation algorithm.

Modular key derivation formula: One party, or the other, picks randomized values for the modular key derivation formula, and both parties compute the resultant derived key candidate $K'_{t+1}$. The parties may use one of modular arithmetic formulas presented here, specified with random parameters, and apply this formula to transform the $m_{ij}$ entries of the master key matrix to $k_{ij}$ entries in the corresponding matrix cell in the constructed $K'_{t+1}$ key.

Flatness Adjustment: The parties examine the flatness index, φ for $K'_{t+1}$ and decide whether they wish to leave it as is, or whether they wish to adjust the flatness up or down.

If the parties wish to increase the flatness of $K'_{t+1}$, then they decide together to apply the flatness increase procedure some agreed upon times. The way the flatness increase algorithm is defined, it will be applied equally by the two parties, acting privately, resulting in the same adjusted key.

If the parties wish to decrease the flatness of $K'_{i+1}$, then they will do it in two parts: (a) total elimination of flatness, $\varphi=0$, and (b) increase of flatness to the desired level. The total elimination will result in all $k_{ij}$ values distinct, as described. Next the flatness increase steps will be applied an agreed upon times, to achieve the desired flatness.

Following this procedure the two coordinating parties will share the same key $K'_{i+1} \rightarrow K_{1+1}$, which the adversary will be in the dark about its content, having no knowledge of the master key.

Similarity Examination The parties will privately each check that LINES and FIGURES defined on the newly constructed $K'_{i+1}$ key give different results in all the previous t keys. If satisfied, they use the so constructed $K'_{i+1}$. Otherwise they either re-adjust flatness, or go back to choose a new derivation formula.

The parties will use a $K_{i+1}$ candidate when it passes the similarity test.

Subliminal Applications

An alphabet A comprising $n=2^t$ letters may be written in t-bits strings. But it can also be written in t+s bits, where the extra s bits are used for subliminal communication. In that case the SpaceFlipPlus alphabet will be of size $m=2^{t+s}$ letters, where $2^s$ letters will all be interpreted as the same letter X from the A alphabet. Illustration: the message [Let us meet next week] can be written as [Let us me'e"t next we'e"k] where all the different letters e, e', e", e''' will be interpreted as e on its surface but the particular combinations of flavors of e will carry a subliminal message. This technique has a variety of cryptographic options.

Remote Devices

Climate monitoring devices are dropped on remote locations and communicated with electronically. In many instances security is needed to preserve the integrity of the measurements and to prevent an attacker of taking control of the device. Such remote gadgets often may be powered up by the sun, and operate "forever", except that their cryptographic key gets eroded. The "Forever Key Cryptography" will solve this issue. Applicable both for authentication and for encryption.

Medical Implants

Medical devices that may be externally manipulated to affect a patient health, can also be ill-manipulated to harm the wearer. Such devices usually have a battery limitation, but also a secure key limitation. FEC—Forever Key Cryptography will help.

Satellites

Satellites increasingly become the battleground in a global conflict. Their efficacy for their owner depends on the integrity of the communication with them. No key replacement is feasible, so forever key cryptography is very helpful.

Intelligence Gathering

Devices which are placed in sensitive locations, often at great risk to their handler, may benefit from forever key cryptography.

Mediated Applications

Simple straight forward applications of FKC ("Forever Key Cryptography") involves two parties sharing a secret, in the form of a master key, $K_0$. A step up is to consider a set of mutual strangers wishing to establish trustworthy communication. Diffie and Hellman taught us how two such strangers can establish a continuity of private conversation, which is the foundation of e-commerce today. Alas, DH does not establish identity only continuity, and their cryptography is at risk of compromise with the power of quantum computing.

FKC may step in through a Central Identifier: an entity that establishes a connection with members of the community of strangers (CoS), then connects two or more strangers by letting them share a master key $K_0$. The sharing former strangers will use a randomized derivation algorithm to generate use keys $K_i$, i=1, 2, . . . for their private communication. To the extent that the central identifier, CI, is not in the know as to the derivation algorithm then the communication between the former strangers is secure even against a quantum cryptanalyst.

The FKC Mediated Procedure

A communication environment is comprised of cyber connected elements, "nodes", among them are perfect strangers who nonetheless e-meet and find a common need to converse and or pay privately. The environment also contains a Central Identifier, CI, whose responsibility is to ascertain identities of nodes in the environment. We assume the CI commands a basic level of credibility in its task. Such establishment of identity can be done through physical encounter with the node, or in any other way, which is not the concern here. Once the CI established an identity with node x, it exchanges with x a 'Forever' key, $K_0$.

Let node x and node y encounter in cyberspace and develop a need to converse in private. They can act up the Diffie Hellman procedure and establish de-facto secure channel. Such practice does not identify the nodes to each other, it only establishes continuity and even that is done under the assumption that an attacker is not smart enough to crack DH, and has no quantum computer to crack the security.

The 'Forever' solution is a viable alternative. x and y exchange identity markers and they both connect to the CI with a request to connect between them. The CI first insures that both x and y wish to connect with each other. If one of them is not aware of the request it means that a fraudster tried to steal the identity of either x or y. Once the CI accepts both matching requests, it generates a master key $K^0_{xy}$ for their bilateral use. The CI then uses its 'Forever' procedure with x and y to send them both a copy of $K^0_{xy}$. This is done the normal FKC way, namely: the CI and a node (either x or y) is deriving a user key from their shared master key and use that key to pass $K^0_{xy}$.

If a fraudster lied to x and mis-represented itself as y, and then approached the CI asking for a secret key to talk to x, then the CI will communicate with the y-thief through the master key shared between CI and y. To the extent that the fraudster has no possession of that key, it cannot understand not interpret the secret key the CI sends him.

In the nominal way after the approach of both parties to the CI, both x and y are now in possession of $K^0_{xy}$. The two strangers are now strangers no more. Next they agree of a key derivation algorithm $K^1_{xy}$, and use it to practice 'Forever' cryptography on its basis. They will decide when to switch to the next key $K^2_{xy}$, and so on, maintaining top defense against any attacker.

The parties x and y may keep the shared master key $K^0_{xy}$ for as long as they please, starting more and more communication sessions.

It will be of advantage for the parties to retire their old master key and approach CI for another master key rather frequently. This will hinder any fraudster who managed to steal $K^0_{xy}$ from a party. It might be easier to steal the use key and steal identity for its life span than to steal the master key shared by the CI and a party, x or y. The latter may be stored off the digital grid, as described in U.S. Pat. No. 10,467,522. ("Rock of Randomness").

Parties x and y share a master key $K^o_{xy}$, known to the CI, and they also share agreed upon (in the open, if necessary) successive derivation algorithms $D_i$ used to derive their use keys, $K^i_{xy}$, i=1, 2, . . . . These derivation algorithms may be exchanged between x and y over a channel not open to CI. This will pit CI in the dark as to prying into the private exchange between parties x and y. On the other hand, a stray hacker catching the exchanged derivation algorithms $D_1$, $D_2$, . . . will be in the dark as to the identity of the use key because that stray hacker will not be aware of $K^o_{xy}$.

The above security posture is such that in order to crack into the private communication between x and y, an attacker will have to know both what the CI knows, and what the stray hacker has gleaned (the derivation algorithm). This will require a cooperation between the stray hacker (or call it the network hacker) and the CI. To the extent that the CI is trustworthy this cooperation will not take place unless the network is a competent authority operating with the authority of a prevailing judge or other controlling entity, compelling the CI to share the value of the master key $K^o_{xy}$.

The practice of the CI may be to forget the value of the shared master key $K^o_{xy}$ right after it has been exchanged, so it cannot later be subject to a court order to reveal it.

A society might mark some 'suspicious characters' for which the CI will have to safe keep the values of the dispensed master keys. So that if the police then suspects some bad dealings they can catch the derivation algorithms from the air and then compel the CI to release the master key.

One can envision the CI offered as a service and as such the community of global strangers will have a choice of many CI agents to work with. Two strangers x and y both operating in country C1, may register themselves in a CI operating in country C2, under a different regime. When the police in C1 tries to put surveillance on x and y they will have to request the master key from the CI in country C2. This will make it more difficult, a need to appeal to the Interpol for example.

The CI is country C2 might request a CI in country C1 to establish (physically perhaps) the identities of x and y and pass this establishment cryptographically to the CI in country C2.

Symmetric Cryptography without a Shared Key

Using Two (or More) Keys Generating the Same Cryptographic Output from the Same Cryptographic Input Consider a cryptographic procedure, f, such that two distinct keys $K_1 \neq K_2$ generate the same cryptographic output O from the same cryptographic input I: $O=f(I,K_1)=f(I,K_2)$. Two communicating partners, Alice and Bob, will each use a different key but function as normal key-sharing secret communicators. Several advantages preseent themselves: (i) restricted capture vulnerability, (ii) source tracking, (iii) broadcast flexibility.

INTRODUCTION

Until the mid 1970s cryptography was practiced on the premise of a shared key, K, used by two communication partners, both to encrypt and to decrypt. This premise was challenged by the RSA team, establishing a state where a different key is used one way (e.g. encryption), $K_e$, and a different key used for the reverse transaction (e.g. decryption), $K_d \neq K_e$. Breaking this age-old shared key premise has proven itself earth shaking and it now underlies the majority of usage of cryptography world wide. It is therefore of great interest to explore the new horizon marked by the premise of Key Equivocation Cryptography where two distinct keys operate as if they were the same key in terms of mapping cryptographic input into cryptographic output.

In principle this user-unique key can be used to identify the user—several applications thereto. Also, in principle, let two users share a key, $K_s$, while a third user is in possession of an unshared key, $K_u$ such that the two keys operate the same over a cryptographic function, f. The three parties can communicate freely and secretly. However the two first communicators may decide to use a second key, $K'_s$ to be derived from the first shared key: $K'_s=D(K_s)$, by one party communicating to the other the particulars of the key deriving function D. The third party, will also receive the details of D, but since they have a different key, the application of on their key will yield a different key $K'_u = D(K_u)$, which does not participate in key-equivocaiton cryptography with $K'_s$. We write $K_s=/f/=K_u$ to mean the two keys are equivalent with respect to a key equivocation function f, and we write: $K'_u \neq /f/ \neq K'_u$, or $D(K_s) \neq /f/ \neq D(K_u)$, to mean that the derived keys do not operate the same over a cryptographic function f. This will allow the first two communicators to 'throw the third communicator' out and keep communicating secretly between themselves.

To apply such protocols it is important to use Ordinalization Algorithms, defined as algorithms applied on an input key, $K_i$, to derive from it an output key, $K_o$ which has a given ordinalization image, $ORD_o$.

Ordinalization Algorithms

We regard the following problem: given a key K, with ordinal image ORD(K). Given a target ordinal image $ORD^* \neq ORD(K)$, modify K to K* such that $ORD^*=ORD(K^*)$.

We describe such an algorithm over the 'space' of a SpaceFlipPlus key comprised of q=0.5n(n−1) entries of an n×n matrix. The target ordinal image is expressed by a specific permutation of the q values:

$\{x\}_q = x_1, x_2, \ldots x_q$

Step 1: choose q random values for $\{x\}_q$ such that $o(x_{i-1}, x_i)$ will fit the target ordinal image.

Step 2: list the q values in K, $\{y\}_q = y_1, y_2, \ldots y_q$ by the order specified by $\{x\}_q$:

$x_1, x_2, \ldots x_q$
$y_1, y_2, y, \ldots y_q$

Step 3: for i=1 to i=q do
compute: $\delta i = x_i - y_i$

Step 4: communicate all the q $\delta_i$ values to the holdere of K

Step 5: the holder of K builds K* comprised of $\{y^*\}_q = y^*_1, y^*_2, \ldots y^*_q$ by computing: $y^*_i = y_i + \delta i$
for i=1 to i=q.

Illustration

Let key K be:
0 8 2 4 8 0 7 3 2 7 0 5 4 3 5 0

The respective ordinal image is:

|       | [1,2] | [1,3] | [1,4] | [2,3] | [2,4] | [3,4] |
|-------|-------|-------|-------|-------|-------|-------|
| [1,2] | 0     | 1     | 1     | 1     | 1     | 1     |
| [1,3] | −1    | 0     | −1    | −1    | −1    | −1    |
| [1,4] | −1    | 1     | 0     | −1    | 1     | −1    |

|       | [1,2] | [1,3] | [1,4] | [2,3] | [2,4] | [3,4] |
|-------|-------|-------|-------|-------|-------|-------|
| [2,3] | −1    | 1     | 1     | 0     | 1     | 1     |
| [2,4] | −1    | 1     | −1    | −1    | 0     | −1    |
| [3,4] | −1    | 1     | 1     | −1    | 1     | 0     |

It is desired to modify K to share an ordinal image with key K*:
0 1 2 3 1 0 4 5 2 4 0 6 3 5 6 0
for which the ordinal image is:

|       | [1,2] | [1,3] | [1,4] | [2,3] | [2,4] | [3,4] |
|-------|-------|-------|-------|-------|-------|-------|
| [1,2] | 0     | −1    | −1    | −1    | −1    | −1    |
| [1,3] | 1     | 0     | −1    | −1    | −1    | −1    |
| [1,4] | 1     | 1     | 0     | −1    | −1    | −1    |
| [2,3] | 1     | 1     | 1     | 0     | −1    | −1    |
| [2,4] | 1     | 1     | 1     | 1     | 0     | −1    |
| [3,4] | 1     | 1     | 1     | 1     | 1     | 0     |

Accordingly one would list the 6=0.5*4*3 entries of key K*, and below them the respective entries for K, as follows:

| [1,2] | [1,3] | [1,4] | [2,3] | [2,4] | [3,4] |
|-------|-------|-------|-------|-------|-------|
| 1     | 2     | 3     | 4     | 5     | 6     |
| 8     | 2     | 4     | 7     | 3     | 5     | and compute the δ values: −7 0 −1 −3 +2 +1

The operator of this ordinalization algorithm will pass to the K key holder the series of δ values.

The K key holder will add the 6 values to its values, and thereby construct key K* with the desired ordinal image ORD*. An eavesdropper aware only of the δ values will be in the dark as to the contents of K.

The operator of this algorithm may wish to hide the content of K*, and devise a different key K*' with the same ordinal image: ORD*=ORD(K*)=ORD(K*'), by setting up different numbers, to satisfy the ordinal image requirement, and hence generate different δ values, resulting in the K key holder having a different key K*' which nonethelesss has the same desired ordinal image ORD* and hence will function well in a cryptographic exchange based on key equivocation cryptography:

| [1,2] | [1,3] | [1,4] | [2,3] | [2,4] | [3,4] |
|-------|-------|-------|-------|-------|-------|
| 10    | 25    | 28    | 50    | 66    | 75    |
| 8     | 2     | 4     | 7     | 3     | 5     | and compute the δ values: +2 +23 +24 +43 +63 +74

Applications

Several advantages present themselves: (i) restricted capture vulnerability, (ii) source tracking, (iii) broadcast flexibility, (iv) Secure sub-community communication.

Revocation Flexibility

We consider a communication manager, CM, managing a conversation among n members $m_1, m_2, \ldots m_n$. Each member is given a unique member key $k_1, k_2, \ldots k_n$, The communication manager, CM, is setting up a first Equivocation-Key, $K^1$ with ordinal image $ORD^1$. The CM is then preparing an ordinalization algorithm to derive each $k_i$ to $k^1_i$, such that:

$$ORD^1 = ORD(K^1) = ORD(k^1_1)$$

To do that the CM communicates to each member an information package that together with its secret key, $k_i$, constructs $k^1_i$. Without knowledge of $k_i$, $k_1^i$ cannot be constructed.

By so doing all n members share a key for key equivocation cryptography which allows them to communicate freely as if they shared the same key. In fact they operate n different keys that share an ordinal image and hence allow them to exercise cryptographic protocol and communicate secretly.

At any time the communication manager, CM, may switch from $K^1$ to $K^2$, and repeat the protocol done over $K^1$. The members will then use $k^2_i$, i=1, 2, ... n and communicate as if they share the same key while in fact they each have a different key.

This switch of keys to $K^3$, $K^4$, etc can continue indefinitely. Any cryptanalysis done over the communication of the n members conversation will be lost when the keys are switched.

It is easy to add member to the group. Each new member receives its own personal key $k_i$ and is treated like the former members.

It is easy to exclude members from the the conversation. The CM simply switches to the next key and excludes the terminated members from the update. Their knowledge of the prior keys is not helpful in guessing and extracting the current key.

This at-will termination may take place for any reason, including suspicion of compromise. Should there be a suspicion that member i compromised its $k_i$, this member will be excluded until he or she come forth to get a new personal key.

Source Tracking

In an organizational environment a communication manager, CM, will issue personalized ordinal keys $k_1, k_2, \ldots k_t$ to t members. The keys are numerically different but ordinally equivalent. Thereby the t members of the organization can communicate freely among themselves using ordinal cryptography. Every so often, the CM changes the ordinal Image of the keys, and sends to the t members the δ values to modify their current key to the new valid one (or using any other method to transform their key). It still remains that all the t members while communicating freely and securely—they do each share a personalized key. This very fact makes it possible to track a source of a leak, since the compromised key will point to its source.

At given time intervals the CM imposes a new ordinal key, as follows: all the t members of the organizations are summoned to contact the CM to receive their personalized key updates. Let M be any member in the set of t members. M will contact CM and identify itself as member M. The CM will know that M is now using key $k_m$, and will send M a small piece of randomized information, r, and will ask M to use its ordinal key, $k_m$, to encrypt r, only that this encryption will be carried out through a conventional cipher where the numeric identity determines the outcome (not merely the ordinal image). If the party claiming to be M is someone else, N M, then N would not be in possession of $k_m$, unless $k_m$ got compromised somehow, and N got a hold of it. But if that happens, when the actual M will come for its input from CM, CM will realize that there is a problem and investigate. For N to stay in the picture then, it will have to re-steal the new key, the old key will be obsolete. The difference from replacing regular key as often is that when a thief comes for its update, it will point to its source. When the same numerical key is shared among the t members, a theft when it is being discovered, does not point to its source.

By adding to the protocol a non-ordinal cipher based on the ordinal key, one uses an identification protocol. So no need for an additional protocol for a party to prove its identity.

Secure Sub Community Communication

Given an organization with t members and a communication manager CM, let the CM assign a unique personal identification number, PIN, to each member. The PIN may be derived from a biometric reading of a person. Let the CM introduce Key Equivocation Cryptography, (KEC), with at least t-level equivocation. Namely there are at least t keys that can be used interchangeably for encryption and decryption.

Let r≤t members wish to establish a secure sub-community for them to talk freely among themselves without exposure to others. The CM will then identify a set of r keys $k_1, k_2, \ldots k_r$, which are perfectly interchangeable in terms of the KEC, and then communicate to each i member of the r group instructions how to build $r_1$ from $PIN_i$, such that only member i of the r group that holds $PIN_i$ will be able to construct $k_i$.

The r group is now ready to communicate among themselves, each member of the r group using their individual key and where all r keys are interchangeable.

This can be done again and again, new keys for new periods of time, and many sub communities may be defined. Security is based on the individual PINs that may be assigned to the members off line.

Building an Ordinal Key from a Shared Secret

Let S be a secret held by a given party, which is known to a second party. Let these parties wish to communicate securely on the basis of S. They can derive a cryptographic key, K, from S (S→K) but by using K, even successive K instances, they will expose more and more information regarding S. So they opt to use S to build an ordinal key, $K_o$, as follows.

Let $K_o$ be used in conjunction with a SpaceFlip n*n matrix (over an alphabet A comprised of n letters). $K_o$ will then be comprised of $q=0.5n(n-1)$ numbers (positive distances between the n letters).

The parties will use any choice method to increase the size of S to S' so that $|S'| \geq gq$, where g is a positive integer, best, if $g \geq 5$. This size enlargement can be done by various ways, (bitwise), like $S'=S^2$, or by hashing S to a hash H then concatenating S and H: $S'=S\|H$. This can be repeated by hashing S' to H' and so repeatedly until the right size is achieved. One could also XOR the two halves of S and add the result to S. Many other ways are possible.

The parties will parcel out S' to q consecutive parts $s_1, s_2, \ldots s_q$, which may or may not be of same bit size (when written in binary). Each of the q numbers in S' will be assigned its identity by its order in S'.

One of the parties will build an ordinal key, $K_o$ and wish to communicate it to the other. It will do so by first writing down the ordinal image of the ordinal key, $ORD(K_o)$, and then use randomization to construct a key $K'_o \neq K_o$ such that $ORD(K'_o)=ORD(K_o)$. The party will do so by adding δ values to $K_o$ as described above, or any of the other ways.

$K'_o$ is comprised of q numbers, marked $x_1, x_2, \ldots x_n$. The party constructing $K'_o$ will then communicate to the other party q numbers $\delta_i = x_i - s_i$ for i=1, 2, ... q.

The recipient party will construct $K'_o$ from the q numbers: $x_i = s_i + \delta_i$.

Others, not sharing S will not be able to construct $K_o$.

In the case where t members each member i has a unique sequence $S_i$, which is known to a communication manager CM, then the CM will be able to use the above procedure to pass to any member a unique ordinal key, which nonetheless will allow the t members to freely and securely communicate with each other.

Ordinal Illustration

We consider the following 'space' over an alphabet A comprised of 5 letters:

| | \multicolumn{5}{c}{Key1:} | | | | |
|---|---|---|---|---|---|
| | L1 | L2 | L3 | L4 | L5 |
| L1 | 0 | 13 | 2 | 10 | 6 |
| L2 | 13 | 0 | 12 | 3 | 11 |
| L3 | 2 | 12 | 0 | 10 | 1 |
| L4 | 10 | 3 | 10 | 0 | 14 |
| L5 | 6 | 11 | 1 | 14 | 0 |

We organize the matrix entries in the following order, to reflect the value order:

[3,5], [1,3], [2,4], [1,5], [1,4], [3,4], [2,5], [2,3],
[1,2], [4,5]1, 2, 3, 6, 10, 10, 11, 12, 13, 14

[i,j] represents the distance between letter $L_i$ and letter $L_j$

We now evaluate LINE(L3, 3) in this key: L3→L5→L1→L4 we now change the values of the key by multiplication by a factor of 2:

[3,5], [1,3], [2,4], [1,5], [1,4], [3,4], [2,5], [2,3],
[1,2], [4,5]2, 4, 6, 12, 20, 20, 22, 24, 26, 28

| | \multicolumn{5}{c}{Key 2:} | | | | |
|---|---|---|---|---|---|
| | L1 | L2 | L3 | L4 | L5 |
| L1 | 0 | 26 | 4 | 20 | 12 |
| L2 | 26 | 0 | 24 | 6 | 22 |
| L3 | 4 | 24 | 0 | 20 | 2 |
| L4 | 20 | 6 | 20 | 0 | 28 |
| L5 | 12 | 22 | 2 | 28 | 0 |

We now evaluate the same line over Key2: LINE(L3, 3) in this key: L3→L5→L1→L4

We now add the ρ manipulation:

| [3,5], | [1,3], | [2,4], | [1,5], | [1,4], | [3,4], | [2,5], | [2,3], | [1,2], | [4,5] |
|---|---|---|---|---|---|---|---|---|---|
| 2, | 4, | 6, | 12, | 20, | 20, | 22, | 24, | 26, | 28 | changing values to:

1, 3, 5, 7, 18, 18, 20, 23, 26, 27 resulting in key Key3:

| | \multicolumn{5}{c}{Key 3:} | | | | |
|---|---|---|---|---|---|
| | L1 | L2 | L3 | L4 | L5 |
| L1 | 0 | 26 | 3 | 18 | 7 |
| L2 | 26 | 0 | 23 | 5 | 20 |
| L3 | 3 | 23 | 0 | 18 | 1 |
| L4 | 18 | 5 | 18 | 0 | 27 |
| L5 | 7 | 20 | 1 | 27 | 0 |

We now evaluate the same line over Key3: LINE(L3, 3) in this key: L3→L5→L1→L4

We see that the three keys give the same cryptographic results because they share the same ordinal image:

To mark the ordinal image we assign identities to the 10 entries of the key:

| [3,5], | [1,3], | [2,4], | [1,5], | [1,4], | [3,4], | [2,5], | [2,3], | [1,2], | [4,5] |
|---|---|---|---|---|---|---|---|---|---|
| a | b | c | d | e | f | g | h | i | j | leading to the depicted ordinal image shared by all three keys:

|   | a | b | c | d | e | f | g | h | i | j |
|---|---|---|---|---|---|---|---|---|---|---|
| a | 0 | −1 | −1 | −1 | −1 | −1 | −1 | −1 | −1 | −1 |
| b | 1 | 0 | −1 | −1 | −1 | −1 | −1 | −1 | −1 | −1 |
| c | 1 | 1 | 0 | −1 | −1 | −1 | −1 | −1 | −1 | −1 |
| d | 1 | 1 | 1 | 0 | −1 | −1 | −1 | −1 | −1 | −1 |
| e | 1 | 1 | 1 | 1 | 0 | 0 | −1 | −1 | −1 | −1 |
| f | 1 | 1 | 1 | 1 | 0 | 0 | −1 | −1 | −1 | −1 |
| g | 1 | 1 | 1 | 1 | 1 | 1 | 0 | −1 | −1 | −1 |
| h | 1 | 1 | 1 | 1 | 1 | 1 | 1 | 0 | −1 | −1 |
| i | 1 | 1 | 1 | 1 | 1 | 1 | 1 | 1 | 0 | −1 |
| j | 1 | 1 | 1 | 1 | 1 | 1 | 1 | 1 | 1 | 0 |

Next Equivocation Resolution—A Fully Defined Solution

Throughout these specifications various options to resolve NEXT equivocation were presented. They may be assembled in various ways. It is important to apply a well defined procedure so that the two communication partners will each apply the resolution in exactly the same way. To that end we present here a Next Equivocation Resolution (NER) which is unambiguous and fitting for an agreement between two communication partners.

It is important to note that the NER is a serious cryptanalytic hurdle, and should be lavishly used. To that end it may be advisable to use high-flatness spaces where the NER is likely to be invoked quite often.

The NEXT function may result in equivocation where NEXT-letter candidates $C_1, C_2, \ldots C_t$ all register the same minimum distance $d_{min}$ from a given letter X: $[C_i, X]=d_{min}$ for i=1, 2, . . . t. Note: the symbol [x,y] represents the distance between letter x and letter y.

We recall the environment: an alphabet A comprised of n letters L1, L2, . . . Ln is defined via a 'space' expressed as $0.5n(n-1)$ distance measures (real numbers) between every two letters in the alphabet. These distances are written as entries in an n×n matrix where the letters are listed as columns and as rows.

This equivocation will be resolved by applying the "NEXT-NEXT" procedure. If equivocation persists the "Centrality Test Procedure" is applied, and if equivocation still persists then "The Associate Zero-Flatness Space" is applied where the equivocation is eliminated, and the clear resolution to the NEXT function is being well defined.

Defining the above mentioned procedures:

NEXT-NEXT Procedure

N1. Evaluate the t distances between the t candidates to their NEXT: $[NEXT(C_i), C_i)]$ N2. There are e candidates for which the distance from their next letter is the smallest (min): $[NEXT(C_j),C_j]=MIN([NEXT(C_i), C_i)]$ for j=1, 2, . . . e, and i=1, 2, . . . t. If e=1 then $C_j=NEXT(X)$ and the equivocation is resolved. If e>1 then apply the "Centrality Test Procedure":

The Centrality Test Procedure

CT1. Evaluate the centrality measure for each of the remaining e candidates. $CENT(C_j)=\Sigma[C_j, C_i]$ . . . for i=1, 2, . . . n.

CT2. There are $1 \le h \le e$ candidates for which $CENT(C_l)=MIN[CENT(C_j)]$ for j=1, 2, . . . e. If h=1 then $C_l=NEXT(X)$ and the equivocation is resolved. If h>1 then apply the "Associate Zero Flatness" test.

The Associate Zero Flatness Test

ZF1. Build the associate Zero flatness test on the basis of the reference key (space). Do so as follows:

ZF1.1 Agree on an order by which to evaluate the $0.5n(n-1)$ entries in the n×n distance matrix (space) over the n letters in the used alphabet A comprised of letters L1, L2, . . . Ln.

ZF1.2 By the agreed order inspect every distance matrix entry. If it is a duplicate of another entry then increment its value by one. If the new value is a duplicate of another value, increment again by one, and keep incrementing until the incremented value has no duplicate in the matrix. Then do the same for the next entry in the distance matrix, until all entries have been processed. This will define a distance matrix free of duplicates and hence of zero flatness.

ZF2. Identify letter $C_m$, among the h candidates resulting from step CT2, for which $[C_m, X]=MIN[C_l,X]$ for l=1, 2, . . . h, where the distances are evaluated over the Associate Zero Flatness Space. (ZFS). Because of the construction of the ZFS, there will be only one of the h candidates for which the minimum distance applies. This candidate is the unequivocated NEXT letter for X: $C_m=NEXT(X)$.

REMARKS

The described procedure is recursive in its first part. It resolves NEXT equivocation by re-applying NEXT again. This may lead to an unending sequence. To prevent such a scenario one may add an arbitrary number g of times when the NEXT function results in equivocation. When the NEXT function is applied g times then the NEXT-NEXT part of the procedure is terminated, and the remaining equivocation is resolved through the centrality test and onward. This add-on will guarantee that this NEXT Equivocation Resolution (NER) procedure will always result in an unequivocated NEXT function, equally evaluated by the two communication partners.

Illustration

We use a rather flat space over alphabet A comprised of 5 letters L1, L2, L3, L4, and L5:

|    | L1 | L2 | L3 | L4 | L5 |
|----|----|----|----|----|----|
| L1 | 0  | 47 | 3  | 9  | 47 |
| L2 | 47 | 0  | 3  | 47 | 9  |
| L3 | 3  | 3  | 0  | 9  | 47 |

|    | L1 | L2 | L3 | L4 | L5 |
|----|----|----|----|----|----|
| L4 | 9  | 47 | 9  | 0  | 9  |
| L5 | 47 | 9  | 47 | 9  | 0  |

We are looking at the LINE function: LINE(L3,3). So we first look at NEXT(L3). We find L1 and L2 with the smallest distance from L3. An equivocation is being presented and must be resolved. We apply the NEXT-NEXT procedure:

NEXT(L1)=L3, and also NEXT(L2)=L3, further [L1, L3]= [L2,L3]=3. Since we started with L3, we clearly have here an infinite loop, so the NEXT-NEXT procedure will not resolve this equivocation (however high we will set the g value for recursive application of NEXT-NEXT). Accordingly we move towards the centrality test:

$CENT(L1)=47+3+9+47=106; CENT(L2)=47+3+47+9=106.$

The equivocation survives the centrality test, so we turn to the associate zero-flatness space. We decide to apply this duplication-removal procedure from first row down and from first column to the right. Looking at [1,2]=47 it is duplicate so we assign: [1,2]=48. 48 is without duplicate so we continue. We look at [1,3]=3, it is also a duplicate, so we increment it [1,3]=4. No duplicate. We move on to [1,4]=9. It is duplicate, so we increment: [1,4]=10. No duplicate. Onward: [1,5]=47. It is a duplicate, so we set [1,5]=48. This is also a duplicate (of [1,2]) so we increment again: [1,5]=49. No duplicate.

Moving to the second line: [2,3]=3. No duplicate, so it stays. [2,4]=47—duplicate. We need to increment it twice since 48 and 49 are duplicates, and hence [2,4]=50. [2,5]=9. duplicate. But 10 is also a duplicate, so we increment twice to [2,5]=11. [3,4]=9. Duplicate. we need to increment three times to [3,4]=12.

We continue: [3,5]=47—no duplicate. The last one [4,5]=9—no duplicate.

This completes the construction of the associate non-flat space which now looks like this:

|    | L1 | L2 | L3 | L4 | L5 |
|----|----|----|----|----|----|
| L1 | 0  | 48 | 4  | 10 | 49 |
| L2 | 48 | 0  | 3  | 50 | 11 |
| L3 | 4  | 3  | 0  | 12 | 47 |
| L4 | 10 | 50 | 12 | 0  | 9  |
| L5 | 49 | 11 | 47 | 9  | 0  |

Based on this new space, the resolution of NEXT(L3) is unequivocated: L2. To find the result of LINE(L3,3), we proceed: L3→L2→L5→L4: So we write: L4=LINE(L3,3).

Had the original space been a bit less flat, one would had a different path. For example:

|    | L1 | L2 | L3 | L4 | L5 |
|----|----|----|----|----|----|
| L1 | 0  | 47 | 3  | 9  | 47 |
| L2 | 47 | 0  | 5  | 47 | 9  |
| L3 | 3  | 5  | 0  | 9  | 47 |
| L4 | 9  | 47 | 9  | 0  | 9  |
| L5 | 47 | 9  | 47 | 9  | 0  |

In that case NEXT(L3) will not be equivocated, but clearly: L1=NEXT(L3). We continue: L4=NEXT(L1); Next (L4) has a triple equivocation, alas, L3 and L1 are excluded because they are already in the LINE, so we write: L5=LINE (L3, 3).

If had to evaluate NEXT(L4) separately, then we had to resolve between L1, L3 and L5. Applying the NEXT-NEXT we get: [L1, NEXT(L1)]=3, [L3, NEXT(L1)]=3, NEXT(L5) is equivocated but whatever the resolution we can write [L5, NEXT(L5)]=9>3. So L5 is excluded as a candidate for NEXT(L4). NEXT-NEXT will not resolve the equivocation between L1 and L3 because they point to each other, so we move to the centrality test: CENT(L1)=47+3+9+47=106, CENT(L3)=3+5+9+47=64. We conclude:

$CENT(L3) < CENT(L1)$ and hence resolve the triple equivocation as L3=NEXT (L4). No need to invoke the associate zero flatness space.

A Review of the Invention

This invention describes a method to extend the useful life of a cryptographic key comprising a procedure, f, wherein a cryptographic input, I, yields a cryptographic output, O, by applying a cryptographic key, $K_1$: $O=f(I,K_1)$, such that there are infinite number, t, of other keys $K_2, K_3, \ldots K_t$ such that $K_i \ne K_j$, for all i,j=1, 2, . . . t, and such that each of these t keys generates the same cryptographic output from the same cryptographic input: $O=f(I, K_i)$, wherein two communication partners share a secret master key $K_0$, and proceed as follows:

(i) they select a derivation algorithm D that derives a key $K_i$, for i=1 from $K_0$: $=D(K_0)$, (ii) they use $K_i$ for some arbitrary measure of usage where an arbitrary amount of cryptographic input, I is processed into a cryptographic output, O, using $K_i$, following which (iii) the communication partners increment the value of i: i→(i+1), and repeat steps (i), (ii), and (iii) for as long as there is cryptographic input to be processed, thereby cryptanalytic gains secured from cryptanalysis of the output generated from keys $K_1, K_2, \ldots K_i$, will not be useful for the effort to cryptanalyze $K_{i+1}$, keeping $K_0$ indefinitely useful.

This method is regarded as 'forever key' cryptography: FKC

FKC is implemented wherein the cryptographic procedure, f, is based on using only ordinal properties of the keys, $K_1, K_2, \ldots K_m$, wherein ordinal properties are defined as follows:

let key $K_i$ be comprised of an ordered series of q digital numbers: $N_1, N_2, \ldots N_q$, let an ordinal function, o, be defined over two real numbers, a, and b as follows: if a<b then o(a,b)=−1, if a=b then o(a,b)=0, if a>b then o(a,b)=1, let the "ordinal image" of a key, $K_i$, $ORD(K_i)$ be defined as the 0.5q(q−1) ordinal values $o(N_u, N_v)$ for u,v=1, 2, . . . q an ordinal property of key $K_i$ will be a property that has the same value for any other key $K'_i \ne K_i$ for which the ordinal images are the same: $ORD(K_i)=ORD(K'_i)$, and since there are infinite keys that share an ordinal image with $K_i$, then a procedure f that only uses ordinal properties of key $K_i$ for i=1, 2, . . . t is an embodiment of the 'forever key' procedure (FKC) above.

A particular implementation of FKC is as follows: the cryptographic procedure f will be based on the operation NEXT that maps a letter $L_i$ of a given alphabet A, to another letter $L_j \ne L_i$ of same alphabet on the basis of a geometric structure defined over the n letters in A through a set of 0.5n (n−1) distance measures $d_{uv}$ between each letter $L_u$ and $L_v$ in A, where u,v=1, 2, ... n, and where the distance between $L_i$ and $L_j$, $d(L_i, L_j)$ is the smallest among all the distances from $L_i$ to all other letters $L_w$, for w≠i, and where if two or more letters have the same smallest distance with respect to $L_i$, then a Next Equivocation Resolution procedure settles this equivocation by using one of the following procedures:

(i) the two or more equal smallest distance candidate for NEXT letter are dismissed, and the NEXT letter is selected among the remaining letters; this dismissal is applied recursively;

(ii) the candidate letter to be NEXT is selected based on which of the candidates has itself a NEXT letter of the smallest distance; this criteria is applied recursively, if the selected Next Equivocation Resolution procedure is not leading to a resolution, then this procedure returns a message 'Next Letter Undefined'.

Any cryptographic procedure based on NEXT will only make use of the ordinal properties of $K_i$.

We may make use of the operation FIGURE which is defined as a sequence of LINE operations, where an original letter $X_0$ is mapped with the first LINE to a letter $X_1$, and where letter $X_1$ is operated with the LINE operator to map $X_1$ to letter $X_2$, and so on, t LINE operators being applied in succession, resulting in outcome letter $X_t$; the mapping $X_0 \rightarrow X_t$ is based only on ordinal properties of $K_i$ More specificity: The method above wherein the FIGURE is used for mutual identity verification by two parties sharing a master key $K_0$; wherein one party, designated as the "identity prover" or "prover" proves its identity to the other party designated as the "identity verifier" or "verifier"; wherein the verifier randomly set a starting letter X, then conveys to the prover the definition of the FIGURE; the prover applies the FIGURE on X and identifies X' as the letter which the FIGURE points to if it starts with X: X'=FIGURE(X), and the prover then communicates X' to the verifier; who also applied the FIGURE to X to compute X'; if the reply from the prover matches the verifier own calculation of the result of applying FIGURE on, then the verifier gains confidence that the prover is in possession of the shared key, and assumed to be the claimed communication partner.

This invention can be used for remote authentication of communicating parties as follows: one of the communicating partners sends a letter X from alphabet A, X∈A to the other by transmitting a FIGURE comprised of l successive LINEs:

$$X = \text{FIGURE}(Y, t_1, t_2, \ldots t_l) = \text{LINE}(\ldots \text{LINE}(Y, t_1) \ldots, t_{l-1}), t_l)$$

indicating that by applying LINE on letter Y at length $t_1$, one identifies a letter that would start another LINE of size $t_2$ letters, resulting in a letter that will start the next line, and so on for l lines, resulting in letter X, the transmitter will select letter Y∈A and $t_1, t_2, \ldots t_{l-1}$ in a random fashion then compute letter Y'=FIGURE(Y, $t_1, t_2, \ldots t_{l-1}$), then will mark a LINE starting from Y' until it reaches letter X at length $t_l$, so that by transmitting Y, $t_1, t_2, \ldots t_l$ to the other party, the other party in possession of the shared key will be able to compute from this FIGURE the identity of letter X.

The transmitter will use this procedure to send to the other party any message of any length consisting of the letters of alphabet A, and the recipient party will be using the same procedure to send messages to the other party.

The above method may require a NEXT equivocation resolution to be handled through a selected option from the list below:

(i) the two or more letter candidates for the NEXT letter in reference to any letter, will be by-passed, and the NEXT letter will be selected among the remaining letters, (ii) the selection of a NEXT candidate among the letters of same minimum distance from the letter for which the next letter is sought, will be carried out by measuring the distances each candidate has from its NEXT letter, and selecting the candidate with the smallest distance to its NEXT, repeating as necessary.

IoT applications: The method described is to be applied in cases where one communication partner is a device that is stationed such that access to replace the shared key is difficult, and this method allows for durable secure communication with the same shared secret key $K_0$.

Mediated Communication Application: The method of claim 1 applied to 'mediated communication' wherein two parties, x and y, with no prior communication do establish secret communication with the help of a 'central identifier', CI, with which both parties have established a secure secret master key $K_{0x}$ and $K_{0y}$ respectively, wherein both parties use their secret master key to share use-keys with the CI; the secret communication procedure is specified as follows:

(i) Parties x and y independently communicate to the CI their wish to securely communicate with each other, (ii) the CI randomly builds a shared master key for the parties: $K^0_{xy}$, and sends a copy thereto to both x and y, (iii) parties x and y both use $K^0_{xy}$ to derive a series of use keys $K^1_{xy}, K^2_{xy} \ldots K^t_{xy}$ which they use and replace as often as they like.

What is claimed is:

1. A method of extending the useful life of a cryptographic key, the method comprising:

by a processing device:

a cryptographic procedure f, where a cryptographic input, I, yields a cryptographic output, O, by applying a cryptographic key, $K^1$: $O=f(I, K^1)$, with an infinite number, t, of other keys $K^2, K^3, \ldots K^t$ with $K^i \neq K^j$, for all i,j=1, 2, ... t, and with each of these t keys generating the same cryptographic output from the same cryptographic input: $O=f(I, K^i)$, for i=1, 2, ... t;

sharing, by two or more communication partners, a secret master key $K_0$;

performing by the two or more communication partners, the following steps, (i), (ii), (iii), and (iiii), in sequence:

(i) selecting, by the communication partners, a derivation algorithm $D_i$, (ii) deriving, by the communication partners utilizing the derivation algorithm $D_i$, a key $K_i$, for i=1 from $K_0$: $K_i = D_i(K_0)$, (iii)) utilizing, by the communication partners, $K_i$ for an arbitrary measure of usage where an arbitrary amount of cryptographic input, I is processed into a cryptographic output, O, using $K_i$, and (iiii) incrementing, by the communication partners, the value of i: i→(i+1), and repeating steps (i), (ii), (iii), and (iiii) in sequence for as long as cryptographic input is available to be processed; and preventing cryptanalytic gains extracted from cryptanalysis of the output generated from keys $K_1, K_2, \ldots K_i$, of providing assistance in the effort to cryptanalyze $K_{i+1}$, due to each $K_i$ for i=1, 2, ... p, where p is arbitrarily large, being accompanied by an infinite number of keys $K_i^1, K_i^2 \ldots K_i^t$, all of which operate on the same cryptographic input, I, in generating the same cryptographic output: $O=f(I, K_i^j)$ for j=1, 2, ... t, which keeps $K_0$ indefinitely valid.

2. The method of claim 1, further comprising:
basing the cryptographic procedure, f, on only ordinal properties of the keys, $K_1, K_2, \ldots K_p$, wherein ordinal properties are defined as follows:
letting key $K_i$ be comprised of an ordered series of q real numbers $N_1, N_2, \ldots N_q$,
letting an ordinal function, o, be defined over two real numbers, a, and b, where if a<b then o(a,b)=−1, if a=b then o(a,b)=0, and if a>b then o(a,b)=1, and
letting the "ordinal image" of a key, $K_i$, $ORD(K_i)$ be defined as the 0.5q(q−1) ordinal values $o(N_u, N_v)$ for u,v=1, 2, . . . q; and
an ordinal property of key $K_i$ having the same value for any other key $K'_i \neq K_i$, of which the ordinal images are the same: $ORD(K_i)=ORD(K'_i)$, with infinite keys sharing an ordinal image of $K_i$.

3. The method of claim 2, further comprising:
basing the cryptographic procedure, f, on an operation NEXT mapping a letter $L_i$ of a given alphabet A, to another letter $L_j \neq L_i$ j=1, 2, . . . (i−1),(i+1) . . . n of the alphabet A on the basis of a geometric structure, "space", serving as a cryptographic key, defined over n letters in the alphabet A through a set of 0.5n (n−1) distance measures $d_{uv}=[u,v]$ between each letter $L_u$ and $L_v$ in the alphabet A, where u,v=1, 2, . . . n, and where the distance between $L_i$ and $L_j$, $d(L_i, L_j)=[i,j]$ is the smallest among all the distances from $L_i$ to all other letters $L_w$, for w≠i, and where if two or more letters have the same smallest distance with respect to $L_i$, then a Next Equivocation Resolution procedure settles the resulting equivocation by selecting and performing one of procedures (a), (aa), or (aaa), or selecting and performing an ordered sequence of procedure (aa), then procedure (aaa):
(a) two or more equal smallest candidates for the NEXT mapped letter are recursively dismissed, and the NEXT mapped letter is selected from among the remaining letters in the alphabet A,
(aa) a candidate letter that becomes the output of the NEXT operation is recursively selected based on which of the candidate letters has itself a NEXT mapped letter of the smallest distance, and
(aaa) the candidate letter that becomes the output of the NEXT operation is the NEXT mapped letter with the smallest centrality index, if there is only one candidate with the smallest centrality index, where the centrality index of the NEXT mapped letter X is the sum total of distances of NEXT mapped letter X towards all other (n−1) letters; and
if the selected and performed NEXT Equivocation Resolution procedure or sequenced procedure results in no resolution, then the NEXT Equivocation Resolution procedure or sequenced procedure returns 'Next Letter Undefined'.

4. The method of claim 3, wherein the cryptographic procedure f utilizes the operation LINE, of which the operation LINE is defined as a sequence of l letters beginning with a starting letter $X_1$, followed by letter $X_2$=NEXT$(X_1)$, followed by letter $X_3$=NEXT$(X_2)$, . . . $X_l$=NEXT$(X_{l−1})$, with each next letter, Xi, i=2, 3, . . . l selected among all the letters of the alphabet A, except the letters $X_1$, $X_2, \ldots X_{l−1}$, and where the operation LINE is expressed as $L_i$=LINE$(X_1, l)$.

5. The method of claim 4, wherein the cryptographic procedure f utilizes an operation FIGURE, of which the operation FIGURE is defined as a sequence of LINE operations, where an original letter $X_0$ is mapped with a first LINE operation to a letter $X_1$, where letter $X_1$ is operated on with the LINE operation to map $X_1$ to letter $X_2$, and where letter $X_j$ is operated on with the LINE operation to map $X_j$ to letter $X_{j+1}$, with t LINE operators applied in succession, resulting in an outcome letter $X_t$; the mapping $X_0 \rightarrow X_t$ based only on ordinal properties of $K_i$.

6. The method of claim 5, further comprising:
a procedure of mutual identity verification, where the operation FIGURE is used for mutual identity verification by two parties sharing a master key $K_0$, where one of the two parties, designated as the "identity prover" or "prover" proves its identity to the other of the two parties designated as the "identity verifier" or "verifier", wherein the verifier randomly sets a starting letter X, then conveys to the prover the definition of the operation FIGURE; and
the prover further applying the operation FIGURE on X and identifying X' as the letter which the operation FIGURE points to if it starts with X: X'=FIGURE(X), and the prover then communicating X' to the verifier, the verifier also applying the operation FIGURE to X to compute X', if the reply from the prover matches the verifier's own calculation of the result of applying the operation FIGURE on X, then the verifier is indicated that the prover is in possession of a shared key, and where after successful repetition of this procedure of mutual identity verification the verifier accepts the prover as a communication partner.

7. The method of claim 5, further comprising:
providing for durable secure communication with the shared secret master key $K_0$ in cases where one communication partner is located where access to replace the shared secret master key is difficult.

8. The method of claim 3, further comprising:
a communication procedure between communicating partners, for transmitting and receiving any message of any length consisting of the letters of the alphabet A, comprising:
the transmitting communicating partner transmitting a letter X from the alphabet A, X∈A to the receiving communicating partner by transmitting a FIGURE comprised of l successive LINEs, X=FIGURE(Y, $t_1$, $t_2$, . . . $t_l$)=LINE(LINE( . . . LINE(Y, $t_1$) . . . , $t_{l−1}$), $t_l$);
indicating a starting letter of the next line of size $t_i$ (for i=2, 3, . . . l) letters by applying LINE on letter Y at length $t_i$, for i=1, 2, . . . l lines, resulting in letter X; and
selecting randomly, by the transmitting communicating partner, letter Y∈A and selecting randomly (l−1) positive integers $t_1, t_2, \ldots t_{l−1}$, computing, by the transmitting communicating partner, letter Y'=FIGURE(Y, $t_1, t_2, \ldots t_{l−1}$), marking, by the transmitting communicating partner, a LINE starting from Y' until it reaches letter X at length $t_l$, wherein transmitting Y, $t_1, t_2, \ldots t_l$ from the transmitting communicating partner to the receiving communicating partner, and the receiving communicating partner which is also in possession of a shared key computes from the FIGURE the identity of letter X.

9. The method of claim 3, further comprising:
NEXT equivocation among t equivocation candidates for a pre-NEXT letter X is resolved by applying a "NEXT-NEXT" procedure, if equivocation still persists a "Centrality Test" procedure is applied, and if equivocation further still persists then an "Associate Zero-Flatness Space" procedure is applied, the equivocation is eliminated, and a resolution to the NEXT function is assigned;

the "NEXT-NEXT" procedure comprises performing steps (n1) and (n2), in sequence:
(n1) evaluating the t distances between the t equivocated candidate letters, $C_i$, to their NEXT: [NEXT($C_i$), $C_i$]], and
(n2) marking the e candidates $C_i$ for i=1, 2, ... e, for which the distance from their next letter is the smallest (min): [NEXT($C_j$),$C_j$]=MIN([NEXT($C_i$), $C_i$)] for j=1, 2, ... e, and i=1, 2, ... t, if e=1 then $C_j$=NEXT(X), resolving the equivocation, if e>1 then the equivocation is not resolved and the "Centrality Test" procedure is activated;
the "Centrality Test" procedure comprises performing steps (ct1) and (ct2), in sequence:
(ct1) evaluating a centrality measure for each of the remaining e candidates, Cj, for j=1, 2, ... e, where the centrality measure of a letter is the sum total of its distances from all other letters in the alphabet, and
(ct2) for the 1≤h≤e candidates for which the centrality measure is minimum; if h=1 then Cj=NEXT(X); if h>1 then the "Associate Zero-Flatness Space" procedure is activated;
the "Associate Zero-Flatness Space" procedure comprises performing steps (zf1), (ZF1.1), (ZF1.2), and (ZF2), in sequence:
(zf1) executing an associate Zero flatness test on the basis of a shared key created as described in steps (ZF1.1) and (ZF1.2):
(ZF1.1) agreeing on an order by which to evaluate the 0.5n(n−1) entries in the n×n distance matrix (space) over the n letters in alphabet A comprising letters L1, L2, ... Ln, and
(ZF1.2) by the agreed upon order inspecting every distance matrix entry, if a distance matrix entry is a duplicate of another distance matrix entry then incrementing the distance matrix entry value by one, if the resulting new value is a duplicate of another value, increment the resulting new value again by one, and keep incrementing the resulting new value until the resulting new incremented value has no duplicate in the matrix, then performing the same incrementing procedure for the next entry in the distance matrix, until all entries have been processed, resulting in defining a distance matrix, "space", free of duplicates, and
(ZF2) identifying a letter $C_m$ among the h candidates resulting from step (ct2) that is closer to X than all other h candidates, over the space built in step (ZF1.2), then assigning $C_m$=NEXT(X).

10. The method of claim 3, further comprising:
where a key is generated with a source of randomness that generates q numbers in the range 1 to an arbitrary value R, where all the randomized q numbers are unique by making R a large enough value, and if all the randomized q numbers are not unique, the key generation with a source of randomness is repeated until all the randomized q numbers are unique;
assigning duplicate keys as performed in steps (c), (cc), (ccc), (cccc), and (ccccc), in sequence:
(c) initializing a desired duplication level b' as an integer, where b=1, 2, ... b',
(cc) identifying x as the highest value of the 0.5n(n−1) distances among the n letters in the alphabet A generated with a source of randomness, with b or fewer numbers of a same value,
(ccc) identifying y as the second highest value of the 0.5n(n−1) distances among the n letters in the alphabet A generated with a source of randomness, with b or fewer numbers of a same value,
(cccc) changing the values of the numbers identified in step (cc) to y, and
(ccccc) for b<b' repeating steps (cc) to (cccc) after incrementing b→b+1 which increases the occurrence of duplicates in the key generated with a source of randomness to the desired level b'.

11. The method of claim 1, further comprising:
providing an establishment of mediated secret communications between two parties with no prior communication between each other, x and y, by utilizing a central identifier CI, where both of the two parties, x and y, have previously utilized their respective secret master key $K_{0x}$ and $K_{0y}$, in each establishing secret communications with the CI, by further establishing shared use keys with the CI, through derivation algorithms $D_x$ and $D_y$ respectively, as performed in steps (b), (bb), and (bbb), in sequence:
(b) parties x and y independently communicate to the CI their intent to securely communicate with each other,
(bb) the CI randomly builds a shared secret master key for the parties, $K^0_{xy}$, and sends a copy of $K^0_{xy}$ to both parties x and y, and
(bbb) parties x and y both use $K^0_{xy}$ to derive a series of use keys $K^1_{xy}, K^2_{xy} \ldots K^t_{xy}$, which parties x and y both use and replace as often as desired in enabling and processing communications with each other.

* * * * *